(12) United States Patent
Wang et al.

(10) Patent No.: US 12,001,746 B2
(45) Date of Patent: Jun. 4, 2024

(54) ELECTRONIC APPARATUS, AND METHOD FOR DISPLAYING IMAGE ON DISPLAY DEVICE

(71) Applicants: BOE TECHNOLOGY GROUP CO., LTD., Beijing (CN); PEKING UNIVERSITY, Beijing (CN)

(72) Inventors: Shuai Wang, Beijing (CN); Yadong Mu, Beijing (CN); Jie Feng, Beijing (CN); Yiming Bai, Beijing (CN); Xiangye Wei, Beijing (CN); Qiong Wu, Beijing (CN); Ge Ou, Beijing (CN); Nan Zhuang, Beijing (CN); Guoqiang Gong, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 3 days.

(21) Appl. No.: 17/757,305

(22) PCT Filed: May 25, 2021

(86) PCT No.: PCT/CN2021/095742
§ 371 (c)(1),
(2) Date: Jun. 14, 2022

(87) PCT Pub. No.: WO2021/254107
PCT Pub. Date: Dec. 23, 2021

(65) Prior Publication Data
US 2023/0010947 A1 Jan. 12, 2023

(30) Foreign Application Priority Data
Jun. 16, 2020 (CN) .......................... 202010549905.X

(51) Int. Cl.
*G06F 3/14* (2006.01)
*G06T 3/4038* (2024.01)
(Continued)

(52) U.S. Cl.
CPC .............. *G06F 3/14* (2013.01); *G06T 3/4038* (2013.01); *G06T 5/005* (2013.01); *G06T 7/194* (2017.01);
(Continued)

(58) Field of Classification Search
CPC ... G06F 3/14; G06T 7/194; G06T 7/70; G06T 3/4038; G06T 5/005; G09G 3/035;
(Continued)

(56) References Cited

U.S. PATENT DOCUMENTS 10,467,933 B2    11/2019   Hur et al.
10,558,264 B1 *   2/2020   Watson ................ H04N 13/156
(Continued)

FOREIGN PATENT DOCUMENTS

CN    102124730 A    7/2011
CN    102914286 A    2/2013
(Continued)

OTHER PUBLICATIONS

Paul Viola; "Rapid Object Detection using a Boosted Cascade of Simple Features", Accepted Conference on Computer Vision and Pattern Recognition; 2001; 9 pages.
(Continued)

*Primary Examiner* — Lixi C Simpson

(57) ABSTRACT

An electronic apparatus and a method for displaying an image on a display device are disclosed. The electronic apparatus includes a display device; an image acquisition device configured to acquire a surrounding image of the display device; and a processor configured to: determine a background image of the display device according to the surrounding image; acquire a target range and a target object in the background image; determine a target image according to the background image, the target range and the target
(Continued)

object; and control the display device to display the target image, wherein the target image excludes the target object.

20 Claims, 16 Drawing Sheets

(51) Int. Cl.
| | | |
|---|---|---|
| *G06T 5/00* | (2006.01) | |
| *G06T 7/194* | (2017.01) | |
| *G06T 7/70* | (2017.01) | |
| *G06V 10/25* | (2022.01) | |
| *G06V 10/764* | (2022.01) | |
| *G06V 40/10* | (2022.01) | |
| *G09G 3/00* | (2006.01) | |

(52) U.S. Cl.
CPC ............... *G06T 7/70* (2017.01); *G06V 10/25* (2022.01); *G06V 10/764* (2022.01); *G06V 40/103* (2022.01); *G09G 3/035* (2020.08); *G06V 2201/07* (2022.01); *G09G 2380/02* (2013.01)

(58) Field of Classification Search
CPC .. G09G 2380/02; G06V 10/25; G06V 40/103; G06V 10/764; G06V 2201/07
See application file for complete search history.

(56) References Cited

U.S. PATENT DOCUMENTS

| | | | |
|---|---|---|---|
| 10,579,206 | B2 | 3/2020 | Park et al. |
| 11,043,187 | B2 | 6/2021 | Li et al. |
| 2012/0013646 | A1 | 1/2012 | Ichioka et al. |
| 2018/0174555 | A1 | 6/2018 | Lee et al. |
| 2020/0043344 | A1* | 2/2020 | Shimizu ................. G06Q 50/30 |
| 2020/0058130 | A1* | 2/2020 | Shen ......................... G06T 7/55 |
| 2021/0027540 | A1* | 1/2021 | Lee ....................... G06T 19/006 |

FOREIGN PATENT DOCUMENTS

| | | |
|---|---|---|
| CN | 103295370 A | 9/2013 |
| CN | 103491290 A | 1/2014 |
| CN | 103559007 A | 2/2014 |
| CN | 103997606 A | 8/2014 |
| CN | 104703016 A | 6/2015 |
| CN | 105472174 A | 4/2016 |
| CN | 107534751 A | 1/2018 |
| CN | 107705364 A | 2/2018 |
| CN | 107846556 A | 3/2018 |
| CN | 108235125 A | 6/2018 |
| CN | 109863471 A | 6/2019 |
| CN | 109996052 A | 7/2019 |
| CN | 209446921 A | 9/2019 |
| JP | 2006333301 A | 12/2006 |
| KR | 20180072337 A | 6/2018 |
| WO | 2015/056932 A1 | 4/2015 |
| WO | 2019/194423 A1 | 10/2019 |

OTHER PUBLICATIONS

Zhengyou Zhang; "A Flexible New Technique for Camera Calibration", Technical Report; MSR-TR-98-71; Dec. 2, 1998; 22 pages.
Patrick Perez et al; "Poisson Image Editing", Microsoft Research UK; 6 pages; 2003.

* cited by examiner

ELECTRONIC APPARATUS, AND METHOD FOR DISPLAYING IMAGE ON DISPLAY DEVICE

CROSS REFERENCE TO RELATED APPLICATIONS

This application is a National Stage of International Application No. PCT/CN2021/095742, filed May 25, 2021, which claims priority to and the benefit of Chinese Patent Application No. 202010549905.X, filed Jun. 16, 2020, the entireties of which are hereby incorporated herein by reference.

TECHNICAL FIELD

The present disclosure relates to the field of display technology, and in particular, to an electronic apparatus and a method for displaying an image on a display device.

BACKGROUND

Existing solutions for display devices such as televisions, monitors, interactive screens may have screens of large sizes, which results in that when no image is displayed on a display device, the black and/or mirror-like appearance of the display device looks incompatible with the surrounding environment.

SUMMARY

In order to solve the above problems, the present disclosure provides an electronic device which includes: a display device; an image acquisition device configured to acquire a surrounding image of the display device; and a processor configured to: determine a background image of the display device according to the surrounding image; acquire a target range and a target object in the background image; determine a target image according to the background image, the target range and the target object; and control the display device to display the target image, wherein the target image excludes the target object.

In some embodiments, the display device comprises: a frame; a flexible display screen disposed on one side of the frame; and a control circuit disposed on the other side of the frame, wherein the flexible display screen is connected to the control circuit.

In some embodiments, the flexible display screen includes a curved display portion, and wherein the flexible display screen is connected to the control circuit includes: the curved display portion is connected to the control circuit.

In some embodiments, an angle between the curved display portion and a front surface of the display device is 90 degrees, and an optical axis of the image acquisition device is perpendicular to the front surface of the display device.

In some embodiments, the determining the target image according to the background image, the target range and the target object includes: removing the target object from the background image to obtain a first image, wherein the first image includes a region from which the target object has been removed; performing image filling on the region after the target object has been removed to obtain a second image; and determining a part of the second image corresponding to the target range as the target image.

In some embodiments, the performing image filling on the region after the target object has been removed to obtain the second image includes: performing image filling on the region from which the target object has been removed according to image information of the background image to obtain the second image.

In some embodiments, the determining the target image according to the background image, the target range and the target object includes: detecting whether the target object is within the target range; in a case where at least a part of the target object is within the target range, removing the target object from the background image to obtain a first image, wherein the first image includes a region from which the target object has been removed; performing image filling on the region after the target object has been removed to obtain a second image; determining a part of the second image corresponding to the target range as the target image; and in a case where the target object is outside the target range, determining a part of the background image corresponding to the target range as the target image.

In some embodiments, the image acquisition device includes a first image acquisition device and a second image acquisition device, wherein the first image acquisition device and the second image acquisition device are different types of image acquisition devices.

In some embodiments, the first image acquisition device is configured to acquire a non-wide-angle image and the second image acquisition device is configured to acquire a wide-angle image.

In some embodiments, the image acquisition device includes at least two wide-angle image acquisition devices and/or at least two non-wide-angle image acquisition devices; the processor is further configured to obtain the background image by stitching images captured by the at least two wide-angle image acquisition devices and/or the at least two non-wide-angle image acquisition devices.

In some embodiments, the processor is further configured to: control enabling one of the first image acquisition devices and the second image acquisition devices according to distance information; wherein the distance information indicates a distance between the image acquisition device and a background object included in the background image, and the distance information is obtained by the at least two wide-angle image acquisition devices or the at least two non-contact image acquisition devices.

In some embodiments, the controlling the enabling one of the first image acquisition devices and the second image acquisition devices according to the distance information includes: the processor enables the wide-angle image acquisition devices in a case where the distance information indicates that the distance between the image acquisition device and the object included in the background image is less than a predetermined distance.

In some embodiments, acquiring the target object in the background image includes: performing object detection on the background image to obtain a category of an object present in the background image; determining whether the present object belongs to a predetermined category; and determining the obj ect belonging to the predetermined category as the target object.

In some embodiments, the object belonging to the predetermined category is a person.

In some embodiments, the acquiring the target object in the background image includes: detecting that at least one object is present in the background image; determining a distance between each of the at least one object and the display device; and determining an object with a distance from the display device smaller than a distance threshold as the target object.

In some embodiments, the acquiring the target object in the background image includes: determining that a moving object is present in the background image based on at least two surrounding images acquired by the image acquisition device at different times; and determining the moving object as the target object.

In some embodiments, the electronic apparatus further includes an ambient sensor, the ambient sensor is configured to acquire information about the surrounding environment of the display device; and the processor is further configured to change the target object in response to a change in the surrounding information.

In some embodiments, the acquiring the target range includes: determining the target range based on a size of the display device.

In some embodiments, the obtaining the target range includes: determining a user position relative to the display device; determining the target range based on the user position.

In some embodiments, the determining the user position relative to the display device includes: determining a user, among a plurality of users, who is watching the display device; determining the user who is watching the display device as a target user; and determining a position of the target user relative to the display device as the user position.

In some embodiments, the processor is further configured to control the image acquisition device to adjust an angle between the image acquisition device and the display device in response to a change of the user position.

In some embodiments, the processor is further configured to control the image acquisition device to adjust an image acquisition frequency of the image acquisition device in response to a change in at least one of a moving range and a moving speed of the user.

In some embodiments, the image acquisition device includes a first image acquisition device and a second image acquisition device, the processor is further configured to: control enabling of one of the first image acquisition device and the second image acquisition device in response to a change in at least one of the range of movement and the speed of movement of the user; wherein the first image acquisition device and the second image acquisition device have different image acquisition frequencies.

In some embodiments, the determining the target image according to the background image, the target range, and the target object includes: removing the target object from the background image to obtain a first image in a case where an area occupied by the target object in the background image exceeds a predetermined area threshold; and determining a part of the first image corresponding to the target range as the target image.

In some embodiments, the determining the target image according to the background image, the target range, and the target object includes: detecting an ambient condition with an ambient sensor; removing the target object from the background according to the ambient condition to obtain a first image; and determining a part of the first image corresponding to the target range as the target image.

According to another aspect of the present disclosure, a method for displaying an image on a display device is provided, the method includes: acquiring a surrounding image of the display device; determining a background image of the display device according to the surrounding image; acquiring a target range and the target object in the background image; determining a target image according to the background image, the target range and the target object; and controlling the display device to display the target image, wherein the target image excludes the target object.

According to another aspect of the present disclosure, an electronic apparatus is provided, the electronic apparatus includes: a display device; an image acquisition device configured to acquire a surrounding image of the display device; an ambient sensor configured to obtain information about surrounding environment of the display device; and a processor configured to: determine a background image of the display device according to the surrounding image; acquire a target range and a target object in the background image; determine a target image according to the background image, the target range and the target object in the background image; and control the display device to display the target image, wherein the target image contains the target object in the background image, properties of the target object in the target image are different from properties of the target object in the background image, and the properties of the target object in the target image change in response to a change in the information about the surrounding environment.

According to the electronic apparatus and the method for displaying an image on a display device provided by the present disclosure, an image can be adaptively displayed on the display device such that the display device can blend in with the surrounding environment. By adaptively removing a target object from the background image, a better display effect can also be provided to a user. With various types of image acquisition devices provided on the display device, the various types of image acquisition devices can be used for background objects at various distances to obtain a more complete background image.

BRIEF DESCRIPTION OF THE DRAWINGS

In order to illustrate the technical solutions of the embodiments of the present disclosure more clearly, the following briefly introduces the accompanying drawings used in the description of the embodiments. Apparently, the accompanying drawings in the following description are only some embodiments of the present disclosure. For those of ordinary skill in the art, other drawings can also be obtained based on these drawings without creative work. The following drawings are not intentionally drawn to scale, and the emphasis is placed on illustrating the subject matter of the present disclosure.

DETAILED DESCRIPTION

Figure 1A:
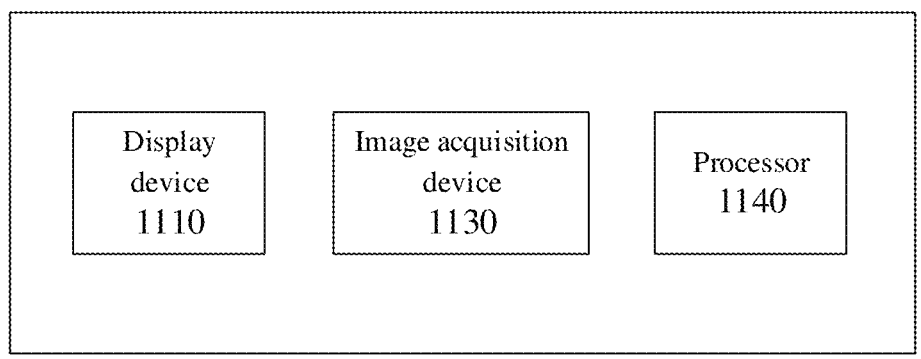
FIG. 1A illustrates an electronic apparatus according to embodiments of the present application.

The technical solutions in the embodiments of the present disclosure will be clearly and completely described below with reference to the accompanying drawings. Apparently, the described embodiments are only some of the embodiments of the present disclosure, but not all of the embodiments. Based on the embodiments of the present disclosure, all other embodiments obtained by those of ordinary skill in the art without creative efforts also fall within the protection scope of the present disclosure.

As used in this disclosure, "first," "second," and similar terms do not denote any order, quantity, or importance, but are merely used to distinguish the various components. Likewise, a term such as "including" or "comprising" means that elements or things appearing before the term encompass elements or things recited after the term and their equivalents, but do not exclude other elements or things. A term such as "connected to" or "connected with" are not limited to physical or mechanical connections, but can include electrical connections, regardless directly or indirectly. Terms "up", "down", "left", "right", and the like are only used to represent the relative positional relationship, and when the absolute position of the described object changes, the relative positional relationship can also change accordingly.

As shown in this disclosure and the claims, unless the context clearly dictates otherwise, terms "a", "an", "one" and/or "the" are not intended to be specific in the singular and can include the plural. Generally speaking, the terms "including" and "comprising" only imply that the clearly identified steps and elements are included, and these steps and elements do not constitute an exclusive list, and the method or device can also include other steps or elements.

A display device can be utilized to display images to a user in various application scenarios. In order to achieve a better display effect, the size of the display region of the display device tends to be increasingly large. For example, there are more and more large-sized displays. Since the display device does not display images all the time, when there is no need for display, the display screen is generally in black or in other specific colors, or some display screens may have a mirror effect, which often presents a significant contrast with the surrounding environment. Thus, an image of the background behind the display device can be displayed on the device to make the display device blend in with the surrounding environment. The image mentioned here can be a single image or multiple frames of images of a video.

Embodiments of the present disclosure provide an electronic apparatus including: a display device; an image acquisition device configured to acquire a surrounding image of the display device; and a processor configured to determine a background image of the display device according to the surrounding image; acquire a target range and a target object in the background image; determine a target image according to the background image, the target range and the target object; control the display device to display the target image, wherein the target image excludes the target object. Specifically, the target image can change in response to changes in at least one of the background image, the target range, and the target object. Specifically, the background image can be a background picture behind the display device, and the target object can be content that the user wants to remove or replace; when the position of the display device moves, the background image can change accordingly, and the target image will also change; when the content that the user wants to remove changes, that is, the target object changes, the content to be removed from the target image will also change accordingly, and the target image will also change. In the embodiments of the present disclosure, the target range is the range in the background image which is occupied by the target image to be displayed on the display device. The target range can be set in advance or determined after real-time detection. When the target range changes, the cutout region of the corresponding background image will also change, so the target image will also change accordingly. For example, the target range is changed according to a user position for the display device. When the user is in a different position, the target range will also change, and the display content (i.e., the target image) that the user watches will also change.

During the working process, the display device has at least two modes, one is a "transparent mode" that makes the display device blend in with the surrounding environment, and the other is a normal mode. The normal mode is a state in which the display device receives a video signal from a signal source and display the video. Switching between the two modes can be done in response to a switching operation of a user, or in response to changes in the external environment. For example, the normal mode is activated when a user is detected approaching, and the transparent mode is activated when the user is going away. In the transparent mode, the display device can display the target image behind the display device which is acquired by the image acquisition devices. The target image can include or not include a target object (such as an obstacle blocking the sight line). Whether to remove the target object from the background image of the display device can be determined based on at least one of a type of the object present in the image, a position of a user watching the display device, and a position, a size, a moving speed, a moving range of the object and other properties.

Embodiments of the present disclosure also disclose a method for displaying an image on a display device, including: acquiring a surrounding image of the display device; determining a background image of the display device according to the surrounding image; acquiring a target range and a target object in the background image; determining a target image according to the background image, the target range and the target obj ect; and displaying the target image on the display device; wherein the target image excludes the target object. FIG. 1A illustrates an exemplary block diagram of an electronic apparatus for displaying an image according to the present application. As shown in FIG. 1A, the electronic apparatus can include a display device 1110, an image acquisition device 1130, and a processor 1140. The display device can include a flexible display screen or a non-flexible display screen. In some implementations, the display device 1110 can include a frame, a flexible display screen disposed on one side of the frame, and a control circuit disposed on the other side of the frame. The flexible display screen includes a curved display portion connected to the control circuit. In some implementations, the angle between the curved display portion and the front surface of the display device is 90 degrees, and the optical axis of the image acquisition device is perpendicular to the front surface of the display device. The front surface of the display device refers to the plane that the user faces straight forward when watching the display device.

The image acquisition device 1130 can be configured to acquire a surrounding image of the display device for subsequent image processing. The processor 1140 can be configured to perform the method for displaying an image on a display device described below in connection with FIG. 1B.

Figure 1B:
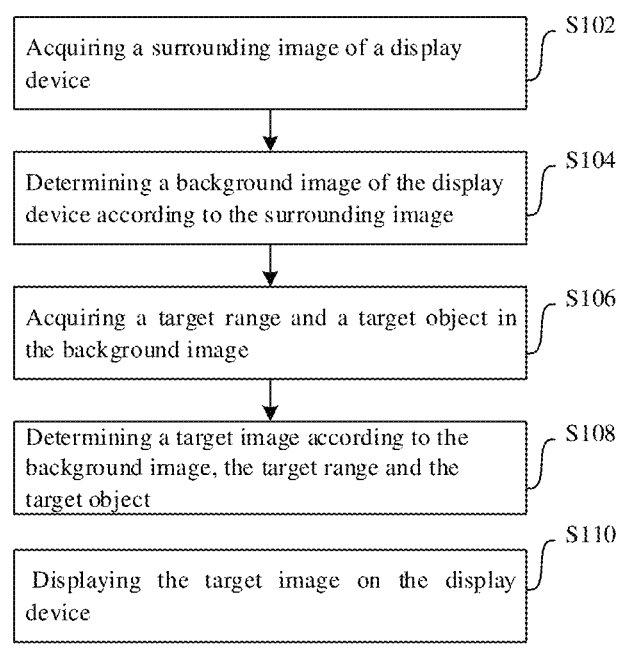
FIG. 1B illustrates a method for displaying an image on a display device according to embodiments of the present application.

FIG. 1B illustrates a method for displaying an image on a display device according to embodiments of the present application.

In step S102, a surrounding image of the display device can be acquired with an image acquisition device. In some implementations, a 360-degree panoramic image around the display device can be acquired as a surrounding image with an image acquisition device disposed around the display device. In other embodiments, a backward image of the display device can be acquired as the surrounding image with the image acquisition device provided on the display device.

In the presence of a user in front of the display device, in some implementations, an angle at which the image acquisition device captures the surrounding image can be adjusted based on the position of the user relative to the display device. Thereby, a surrounding image adapted to the angle of view of the user when watching the display device can be captured according to the user position. In other implementations, the image acquisition device can be controlled to adjust an image acquisition frequency of the image acquisition device in response to a change in at least one of a moving range and a moving speed of the user. In still other implementations, the image acquisition device includes a first image acquisition device and a second image acquisition device. The first image acquisition device and the second image acquisition device have different image acquisition frequencies, and the processor can, in response to a change in at least one of the moving range and the moving speed of the user, control enabling one of the first image acquisition device and the second image acquisition device.

For example, when the movement of the user is small (that is, when the user position does not change much and remains relatively stationary with the display device), the image acquisition device with the lower image acquisition frequency in the two image acquisition devices can be used, and the image acquisition device with the higher image acquisition frequency in the two image acquisition devices can be disabled; if that the moving speed of the user is relatively fast is detected, an image acquisition device with a higher image acquisition frequency is enabled, such that the actual needs of users can be meet and energy consumption can be saved.

The display device can be implemented as a display screen or any electronic apparatus that integrates a display screen. In some implementations, the display device can include a frame. A flexible display screen can be disposed on one side of the frame, wherein the flexible display screen includes a flat portion covering the front surface of the display device and a curved display portion. The angle between the curved display portion and the front surface of the display device can be 90 degrees. The other side of the frame can be provided with a control circuit for realizing the control of the display device, in which the curved display portion is connected to the control circuit. In other embodiments, the display device can also include a non-flexible display screen.

In some embodiments, the optical axis of the image acquisition device can be perpendicular to the front face of the display device. In other embodiments, the angle between the optical axis of the image acquisition device and the front face of the display device can be any suitable angle.

In some embodiments, the image acquisition device can include a first image acquisition device and a second image acquisition device, wherein the first image acquisition device and the second image acquisition device are different types of image acquisition devices. The first image acquisition device can be a non-wide-angle image acquisition device, and the second image acquisition device can be a wide-angle image acquisition device.

The backward image of the display device can be acquired with a plurality of (at least two) image acquisition devices disposed at the back of the display device. Each of the image acquisition devices can include an image sensor and an optical element for collecting light for the image sensor. The image sensor can be CCD, CMOS or any other sensor capable of capturing images. The optical element can be implemented as an optical lens group including at least one optical lens. The surrounding image can be obtained by splicing the images captured by the at least two wide-angle image acquisition devices and/or at least two non-wide-angle image acquisition devices described above.

In some implementations, the plurality of image acquisition devices described above can include at least two types of image acquisition devices. In some examples, the plurality of image acquisition devices can include a type of a wide-angle image acquisition device and/or a type of a non-wide-angle image acquisition device. For example, the plurality of image acquisition devices can include at least two wide-angle image acquisition devices and/or at least two non-wide-angle image acquisition devices. The angle of view of the wide-angle image acquisition device is larger than the angle of view of the non-wide-angle image acquisition device. In some examples, the angle of view of the wide-angle image acquisition device is greater than or equal to 60 degrees, and the angle of view of the non-wide-angle image acquisition device is less than 60 degrees. Specifically, the wide-angle image acquisition device is a wide-angle camera; and the non-wide-angle image acquisition device is an ordinary camera. A wide-angle image acquisition device can be used to acquire a wide-angle image, and a non-wide-angle image acquisition device can be used to acquire a non-wide-angle image.

In step S104, a background image of the display device can be determined according to the surrounding image. In the case where the surrounding image is a panoramic image, the panoramic image can be cropped according to an orientation of the display device to determine the background image. In the case where the surrounding image is a backward image of the display device, the surrounding image can be directly determined as the background image.

In some embodiments, one of the first image acquisition device and the second image acquisition device can be controlled to be enabled based on distance information, wherein the distance information indicates a distance between the image acquisition device and a background object included in the backward image. The distance information is determined by the at least two wide-angle image acquisition devices or the at least two non-wide-angle image acquisition devices.

In some embodiments, when the distance between an object present in the backward image and the display device is less than (or equal to) a predetermined distance threshold, the wide-angle image acquisition device can be enabled to capture the backward image. When the distance between an object present in the backward image and the display device is greater than (or equal to) a predetermined distance threshold, the non-wide-angle image acquisition device can be enabled to capture a backward image. In some examples, the predetermined distance threshold can be 50 centimeters. It can be understood that, those skilled in the art can also set the distance threshold to any suitable value according to the actual situation.

In some implementations, the at least two image acquisition devices disposed at the back of the display device can be configured as an array of image acquisition devices. In the case where the image acquisition devices include wide-angle type image acquisition devices and non-wide-angle type image acquisition devices, the at least two image acquisition devices disposed at the back of the display device can be configured as an array of wide-angle type image acquisition devices and an array of non-wide-angle type image acquisition devices, respectively. The valid field of view of the imaging system can be increased with a form of an image acquisition device array.

In some examples, two groups of image acquisition devices can be disposed at the back of the display device, wherein one group is a horizontal row of wide-angle type image acquisition device group, and the other is a horizontal row of non-wide-angle type image acquisition device group. It can be understood that this is only a schematic example of the present application, and those skilled in the art can set the wide-angle type image acquisition device group and the non-wide-angle type image acquisition device group according to the actual situation as desired. For example, the wide-angle type image acquisition device group and the non-wide-angle type image acquisition device group can also be disposed on two parallel straight lines, respectively. For another example, image acquisition device groups of the same type can also be disposed on at least two parallel lines. Furthermore, it can be understood that the number of image acquisition devices in each type of image acquisition device group is not limited here.

Figure 2A:
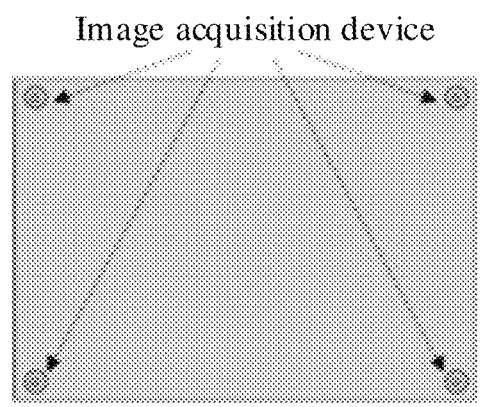
FIG. 2A illustrates a schematic structural diagram of an array of image acquisition devices according to embodiments of the present application.

FIG. 2A illustrates a schematic structural diagram of an array of image acquisition devices according to embodiments of the present application. As shown in FIG. 2A, image acquisition devices 210, 220, 230 and 240 are respectively provided on the four corners of the back of the display device. Image acquisition devices 210, 220, 230, and 240 can be the same, forming a 2*2 array of image acquisition devices.

Figure 2B:
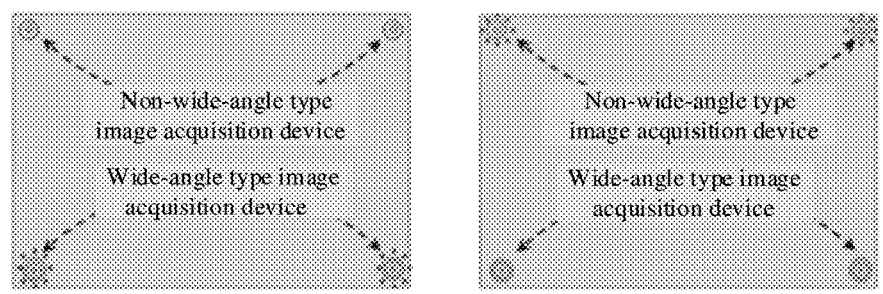
FIG. 2B illustrates another schematic structure of an array of image acquisition devices according to embodiments of the present application.

FIG. 2B illustrates another schematic structure of an array of image acquisition devices according to embodiments of the present application.

As shown in FIG. 2B, non-wide-angle type image acquisition devices 211, 212 and wide-angle type image acquisition devices 213, 214 can be disposed on the four corners of the back of the display device, respectively. The non-wide-angle type image acquisition devices 211 and 212 are disposed at the upper two corners of the display device, and the wide-angle type image acquisition devices 213 and 214 are disposed at the lower two corners of the display device, thereby forming a 1*2 array of non-wide-angle type image acquisition devices and a 1*2 array of wide-angle type image acquisition devices respectively.

It can be understood that, FIG. 2A and FIG. 2B only show two schematic structures for configuring the array of image acquisition devices. Those skilled in the art can set the array of image acquisition devices according to the actual situation as desired. For example, image acquisition devices can be added in the middle of each side of the display device. For another example, in the case where the image acquisition devices include wide-angle type image acquisition devices and non-wide-angle type image acquisition devices, the wide-angle type image acquisition devices can have at least two different angles of view, e.g., two different wide-angle image acquisition devices with 70 degrees and 120 degrees respectively.

Figure 2C:
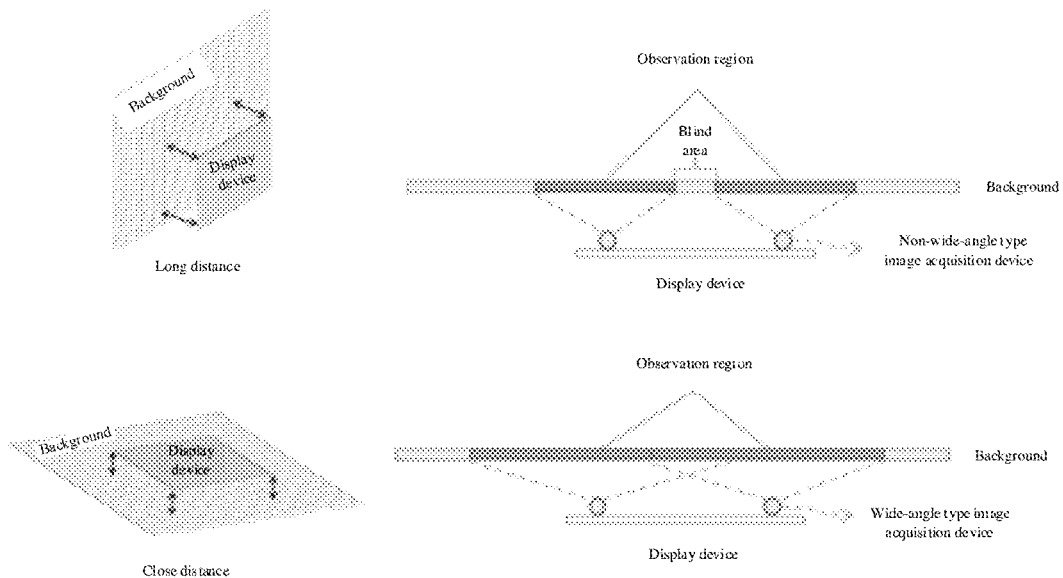
FIG. 2C illustrates a schematic diagram of a configurated observation region of an image acquisition device according to embodiments of the present application.

FIG. 2C illustrates a schematic diagram of an observation region of the configuration of the image acquisition devices according to embodiments of the present application.

As shown in FIG. 2C, due to the small angle of view of the non-wide-angle type of ordinary camera, when the distance between the display device and the rear background is relatively short, there can be blind spots in the backward image acquired by the (array of) non-wide-angle type image acquisition devices. Therefore, when the display device is relatively close to the rear background (e.g., less than 50 cm), the (array of) wide-angle type image acquisition devices can be used to acquire the backward image.

According to the principle of optical imaging, the image acquired by the wide-angle type image acquisition device has large distortion, so the image is distorted. In order to correct the image acquired by the wide-angle image acquisition device, the parameters and distortion coefficients of the image acquisition device can be estimated by capturing and detecting corner points on standard checkerboard paper. For example, Zhang's calibration method can be used to estimate the parameters and distortion coefficients of the image acquisition device. Using the calibrated parameters and distortion coefficients, the image collected by the wide-angle image acquisition device can be corrected to obtain a backward image with less distortion.

However, when the distance between the display device and the rear background is relatively large, even if a non-wide-angle image acquisition device is used, there is no blind spot in the acquired backward image. In this case, with a non-wide-angle type image acquisition device instead of a wide-angle type image acquisition device for image acquisition, the above-described image correction step can be omitted, thereby saving computing resources used in the image processing process.

In some embodiments, a distance sensor can be utilized to determine a distance between an object present behind the display device and the display device. For example, the distance between an object present behind the display device and the display device can be measured using a sensor such as a laser sensor, an infrared sensor, and the like.

In other embodiments, an array of image acquisition devices disposed at the back of the display device can be used to acquire an image, and the distance between an object present behind the display device and the display device can be determined based on the principle of binocular ranging. In this case, the layout of the array of image acquisition devices disposed at the back the display device is aimed at maximizing a common observation region.

Figure 2D:
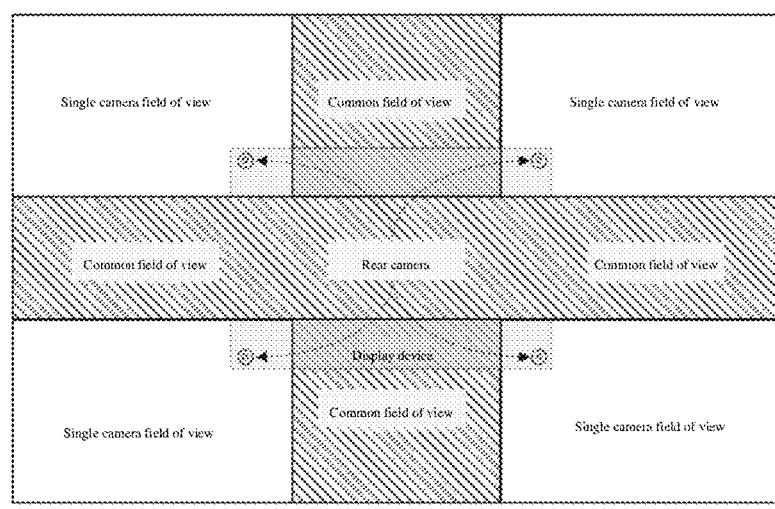
FIG. 2D illustrates a schematic diagram of fields of view of a plurality of image acquisition devices according to embodiments of the present application.

FIG. 2D illustrates a schematic diagram of fields of view of a plurality of image acquisition devices according to embodiments of the present application. As shown in FIG. 2D, the image acquisition devices (such as cameras) disposed at the back of the display screen respectively have separate fields of view for the cameras, and also have a partially overlapping part as a common field of view. An image in the common field of view can be acquired by stitching and fusing single images acquired by different image acquisition devices.

Figure 3:
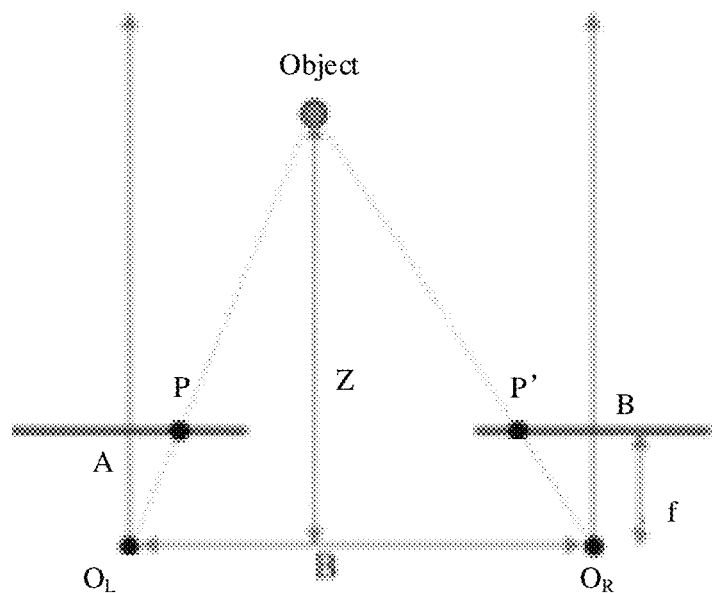
FIG. 3 illustrates a schematic diagram of binocular ranging according to embodiments of the present application.

FIG. 3 illustrates a schematic diagram of binocular ranging according to embodiments of the present application.

As shown in FIG. 3, $O_L$ and $O_R$ are two identical image acquisition devices placed behind the display device, B is a baseline distance between the two image acquisition devices, f is a focal length of the image acquisition devices, point P is an image point of an object on an imaging plane of an image captured by the image acquisition device $O_L$ on the left side, point P' is an image point of the object on an imaging plane of an image captured by the image acquisition device $O_R$ on the right side, and $X_L$ and $X_R$ are lengths of the line segment AP and the line segment BP', respectively. A distance Z between the object and the plane where the image acquisition devices $O_L$ and $O_R$ are located can be calculated with the following Equation (1):

$$\frac{Z}{f} = \frac{B}{X_L \cdot X_R} \quad (1)$$

Figure 8:
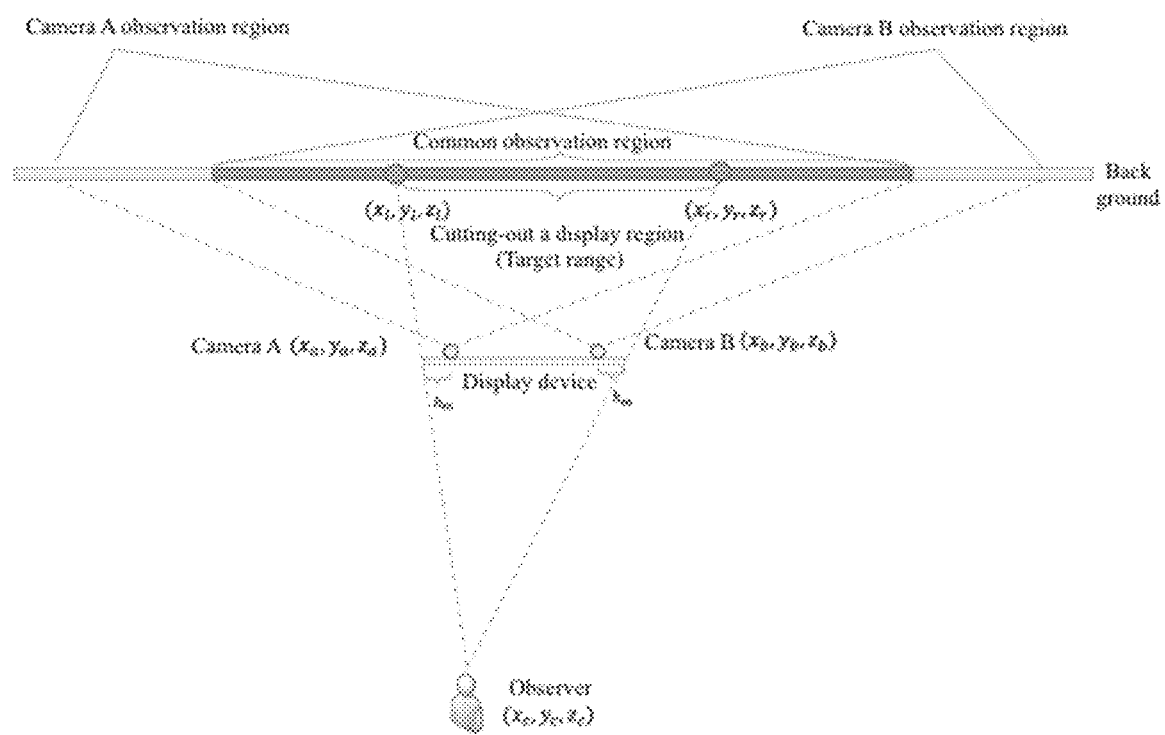
FIG. 8 illustrates a schematic diagram of a process of displaying an image according to embodiments of the present application.

Referring back to FIG. 1B, in step S106, a target range and a target object in the background image can be acquired. The target range in the embodiment of the present disclosure is a range in the background image occupied by the target image to be displayed on the display device. For example, an example of the target range is shown in FIG. 8. The range of the part of the background image occluded by the display device when the user is watching the display device can be determined as the target range.

The target object is a specific object present in the background image. In some embodiments, the target object refers to an object in the background image that occludes the sight of the user. In the embodiments to be described below, the object present in the background image can be determined as the target object through various different rules.

In some embodiments, the target range can be determined based on the size of the display device. For example, a part of the background image that is directly occluded by the display device when the display device is being watched from the front can be determined as the target range. In other embodiments, when there is a user in front of the display device, a user position of the user relative to the display device can be determined, and the target range can be determined based on the user position. That is, a watching range of the user in the background image which is occluded by the display device can be determined as the target range.

The above-described embodiments can be applied when the size of the display device is small, the display device is relatively close to the object in the background, or the user is farther away from the display device. In this case, no matter from where the user watches the display device, the difference in the target range in the background image which is occluded by the display device is relatively small. Therefore, the target range can be directly determined according to the size of the display device without considering the watching position of the user. By displaying the background image within the target range on the display device, a display effect that as if the display device was "transparent" can be formed.

In some embodiments, when there are a plurality of users in front of the display device, images of the plurality of users can be detected to determine a user from the plurality of users who is watching the display device. A user watching the display device can be determined as a target user and a position of the target user relative to the display device can be determined as the user position.

The above-described embodiments are applied when the size of the display device is large, the display device is far away from the object in the background, or the user is at a short distance from the display device. In this case, the target range in the background image that is occluded by the display device when the user is watching the display device will change greatly with the change in the watching position of the user. Therefore, the watching position of the user can be determined and the target range can be determined based on at least the watching position of the user, the size of the display device, and the distance between the display device and the background. By displaying the background image within the target range as determined on the display device, the "transparency" effect of the display device can be adapted to the watching position of the user, so that the effect watched by the user is more natural.

In practical applications, those skilled in the art can determine the corresponding threshold according to the actual situation to determine whether the target range is sufficiently large (or small) with the change in the watching position of the user, so as to determine the method to determine the target range.

In some embodiments, acquiring the target object in the background image can include performing object detection on the background image to obtain a category of the object present in the background image. The target object is determined by determining whether an object present in the background image belongs to a predetermined category.

In some embodiments, an object of a predetermined category present in the background image of the display device can be determined as the target object. For example, an object of a predetermined category can be people, tables, cabinets, chairs, and the like. Those skilled in the art can set a category of objects as the target object according to the actual situation as desired.

In some implementations, an image segmentation model can be used to perform image processing on the background image obtained in step S104 to obtain a category of the pixel points of the object present in the background image. Then, that an object present in the background image belongs to a predetermined category can be determined based on the category of the pixel points of the object. For example, the image segmentation model can be FCN network, SegNet network, atrous convolution, Deeplab series network, RefineNet network, PSPNet network, Large Kernel Matters network, etc. The specific form of the image segmentation model for semantically segmenting the background image to determine whether an object belongs to a predetermined category is not limited here. Those skilled in the art can select any available image segmentation model according to the actual situation.

An image segmentation model is usually obtained based on machine learning, heavily relies on pixel-level semantic annotation, and requires a lot of manpower. When an image segmentation model trained on a specific dataset is used in a new application scenario, pixel-level semantic annotation needs to be performed again for a new unknown category in the scene. Therefore, it is also possible to generate a probability and/or distribution for the unknown category with an unknown category acquisition model including local branches, semi-global branches and global branches, and use the probability and/or distribution of the unknown category as training data to train the image segmentation network, so as to realize automatic labeling of the unknown category in images with image segmentation network without providing pixel-level semantic annotations of the unknown category.

Figure 4A:
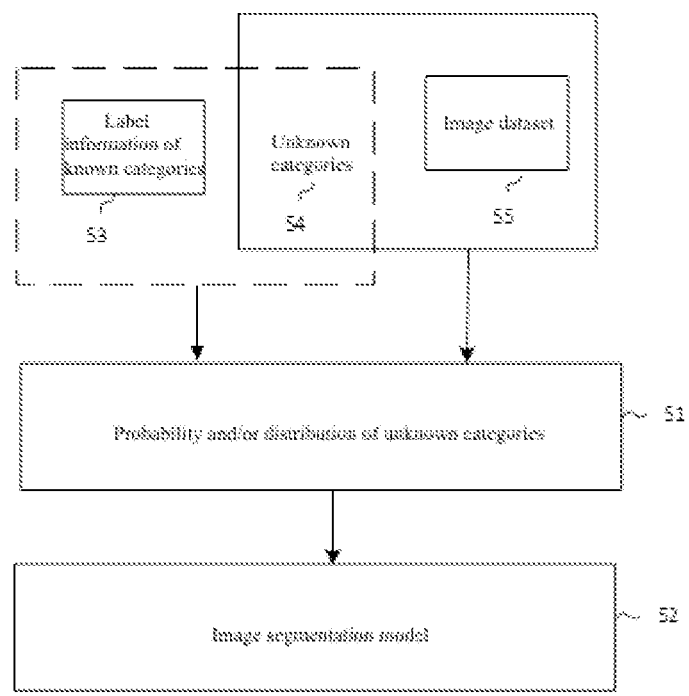
FIG. 4A is a schematic diagram of an image segmentation method according to embodiments of the present disclosure.

FIG. 4A is a schematic diagram of an image segmentation method according to embodiments of the present disclosure.

As shown in FIG. 4A, the present disclosure utilizes an unknown category acquisition model to generate a probability and/or distribution 51 of an unknown category. The probability and/or distribution of the unknown category include a probability that each pixel in the image generated based on label information 53 of a known category is from the unknown category, a probability that an unknown category is present in the image based on an accompanying text (contained in the image dataset 55), and probabilities of regions obtained by subdividing the image based on the annotation information 53 and the accompanying text (contained in the image dataset 55). The unknown category 54 is not annotated. An image segmentation network is trained with the probability and/or distribution of the unknown category as training data, to obtain an image segmentation model 52, and the image segmentation model 52 can be used to segment an input image.

Referring back to FIG. 1B, in other embodiments, in step S106, an object with a distance from the display device less than a predetermined distance threshold can be determined as the target object. It can be understood that an object with a short distance behind the display device will cause more occlusions to the background behind the display device. Therefore, the object in the background image can be determined as the target object according to the distance.

In some implementations, step S106 can include detecting at least one object present in the background image. The background image can be processed by an image segmentation algorithm to determine the presence of at least one object. The distance of each of the detected at least one object from the display device can then be determined. The distance between each object and the display device can be determined by means of a distance sensor or binocular ranging. An object with a distance from the display device less than a predetermined distance threshold can then be determined as the target object.

In other implementations, a distance map can be determined for the background image. The pixels in the distance map correspond to the pixels in the background image one-to-one, and the pixel value of each pixel in the distance map indicates the distance between the object corresponding to the respective pixel in the background image and the display device. The above pixel-level distance map can be generated by means of binocular ranging. The distance between the object corresponding to each pixel in the background image and the display device can be determined according to the distance map, and the object with a distance from the display device smaller than a predetermined distance threshold is determined as the target object.

In still other embodiments, step S106 can include determining that a moving object is present in the background image, and determining the moving object as the target object.

For example, at least two surrounding images at different times can be obtained with an image obtaining device disposed at the back of the display device, two background images at different times can be obtained according to the two surrounding images at different times, and by comparing the above two background images at different times, whether a moving object is present in the background image can be determined.

In some implementations, a moving speed of the moving object can be determined based on acquisition times of the two surrounding images and positions of the moving object in the two surrounding images at different times, and a moving object with a moving speed greater than a predetermined speed threshold can be determined as the target object.

In yet other embodiments, whether an object in the background image is a target object can be determined based on a user selection. In some implementations, an object in the background image can be determined as the target object in response to user input. In other implementations, whether the object in the background image is the target object can be determined by detecting a user state. The user state here can include an emotional state of the user, a psychological state of the user, a preference of the user, and the like. In some examples, whether the background object is the target object can be determined by detecting physiological information (e.g., heartbeat, blood pressure, etc.) of the user and determining the user state based on the detection result. For example, when it is detected that a heartbeat, a blood pressure and other physiological parameters of the user exceed a predetermined threshold, it can be considered that a currently appearing object can have caused fright to the user (that is, the state of the user is frightened), and therefore the current object can be determined as the target object and the target object is removed in a subsequent step. For example, if the user has a phobia of denseness, it can be detected that the physiological parameter of the user exceeds a predetermined threshold when dense objects are present. In this case, dense objects can be determined as target objects and removed in a subsequent step. It can be understood that the user can also determine a property of the target object by himself/herself. In addition, a gaze direction of the user can also be detected while the user state is detected, and the target object can be determined according to the user state and the gaze direction. For example, when the user illustrates a disgusted expression when seeing a certain object, the object can be determined as the target object. In this embodiment, the electronic apparatus further includes a sensor for detecting the state of the user, such as a facial expression recognition apparatus, a body sign sensor, and the like.

In some embodiments, the electronic apparatus in this embodiment further includes an ambient sensor. The ambient sensor is configured to acquire information about the surrounding environment of the display device, and the processor is further configured to change the target object in response to a change in the information about the surrounding environment. Specifically, an ambient sensor can be configured to detect information about the surrounding environment, and the target object can be determined or changed according to the information about the surrounding environment. In some embodiments, the ambient sensor can include a motion detector, a light detector, an audio detector, a thermal sensor, a wireless signal detector, a Bluetooth signal detector, an electric field sensor for proximity detection and/or gesture-based control, an infrared-based sensor for ambient light detection and/or proximity detection and/or gesture-based control, an ultrasonic transducer sensor for proximity detection and/or gesture-based control, a geospatial and/or global positioning sensor. The information about the surrounding environment includes audio information, ambient light brightness, direction of ambient light, outside temperature, weather, conditions of surrounding users, electric field/magnetic field strength and other information. Those skilled in the art can determine or change the target object in connection with the information about the surrounding environment according to the actual situation. Specifically, the ambient sensor can be a face recognition sensor, and the target object is determined according to different identities of identified persons. For example, a user is identified as a child, and an object in the background image that is not suitable for children to watch is used as the target object. Or, when the ambient sensor detects that the identity of the user has changed from a child to an adult, the target object changes accordingly.

In step S108, the target image can be determined according to the background image, the target range and the target object.

In some embodiments, step S108 specifically includes: removing the target object from the background image to obtain a first image, wherein the first image includes a region from which the target object has been removed; performing image filling on the region from which the target object has been removed to obtain a second image; determining a part of the second image corresponding to the target range as the target image. In this way, the background image is first cut and filled, and then the region corresponding to the target range is selected as the target image. During the cutting and filling, the image information of other regions in the background image other than the target object can be fully utilized, which can improve accuracy and fineness of the cutting and filling and enhancing the cutting and filling effects.

In some embodiments, the target object can be removed from the background image to obtain a first image, wherein the first image includes a region from which the target object has been removed.

In some embodiments, the target object can be removed in response to a result of user interaction. For example, user input can be received as a result of user interaction by displaying a user interaction interface on a display device and accepting user input via the user interaction interface. As another example, the display device can also be directly or indirectly connected to any device capable of interacting with the user and accepting user input (such as a mouse, keyboard, tablet, touch screen, remote control, audio sensor, gesture recognition sensor, etc.), to receive user input as a result of user interaction via input/output interface.

The user can select and/or confirm to remove the above-mentioned target object by inputting an instruction via the user interaction interface (or user interaction device), so as to obtain a better display effect.

In other embodiments, whether to remove the target object can also be determined through a predefined rule, so as to realize the automatic removal of the target object.

In some implementations, an area occupied by the target object in the background image can be determined. When the area occupied by the target object in the background image exceeds a predetermined area threshold, the target object can be removed from the background image. The area threshold mentioned here can be an absolute threshold or a relative threshold. For example, the above-mentioned area threshold can be a size of the area occupied by the target object on the display device when the target object is displayed, such as 10 $cm^2$. For another example, the above-mentioned area threshold can also be a proportional value, for example, 10% of the area of the background image. Those skilled in the art can set an appropriate area threshold according to the actual situation, which is not limited here. With this setting method, it is possible to only remove a target object that occupies a large area during display, while retaining a target object with a smaller volume, which makes the display effect more natural and reduces the amount of calculation for image filling after removing the target object.

In other implementations, the area occupied by the target object in the background image can be determined. When the target object is located within a predetermined region, the target object can be removed from the background image. For example, the predetermined region can be a predetermined geometric region centered on a center point of the display range of the display device, such as a rectangular or circular region. When the pixel points of the target object fall within the range of the predetermined region, the target object can be removed. When the target object is located in an edge region of the background image, the target object may not be removed, thereby reducing the amount of calculation for image filling after the target object has been removed.

In still other implementations, a distance between the target object and the display device can be determined, and when the distance between the target object and the display device is less than a predetermined distance threshold, the target object can be removed from the background image. When the distance between the target object and the display device is greater than or equal to a predetermined distance threshold, the target object may not be removed, thereby reducing the amount of calculation for image filling after the target object has been removed.

In some embodiments, an ambient sensor can also be used to detect an ambient condition and remove a target object based on the ambient condition. In some embodiments, the ambient sensor can include a motion detector, a light detector, an audio detector, a thermal sensor, a wireless signal detector, a Bluetooth signal detector, an electric field sensor for proximity detection and/or gesture-based control, an infrared-based sensor for ambient light detection and/or proximity detection and/or gesture-based control, an ultrasonic transducer sensor for proximity detection and/or gesture-based control, geospatial and/or a global positioning sensor. Those skilled in the art can determine the manner of removing the target object in combination with the ambient condition according to the actual situation. For example, the presence of a user around the display device can be determined through audio detection, light detection, motion detection, proximity detection, wireless signal/Bluetooth signal detection, and the target object can be removed based on the result of detecting the presence of the user. For another example, it can be determined according to the positioning sensor that the display device is currently located in a predetermined geographical region, and the target object is removed in the predetermined geographical region, and so on. Specifically, the ambient sensor can be a face recognition sensor, which selectively removes the target object according to the different identities of the recognized persons. For example, if it is identified that the user is a child, and the target object is content that is not suitable for children to watch, the target object is removed then.

In some embodiments, in addition to removing the target object, properties of the target object, such as color, shape, size, rotation angle, position, etc., can also be changed. For example, some users don't like blue, and the color of the target object is blue, then the color of the target object can be changed to other colors.

In some embodiments, after the above-mentioned target object has been removed, image filling can be performed on the region from which the target object has been removed to obtain the second image. A part of the second image corresponding to the target range can be determined as the target image. In some implementations, pixels corresponding to the target object can be removed from the background image, and image filling is performed on the blank region left in the background image after the target object has been removed. Image filling can be performed on the region from which the target object has been removed according to the image information of the background image to obtain a filled background image.

The image filling algorithm can be an algorithm based on similar samples of texture blocks or an algorithm based on a machine learning model such as a deep neural network. Due to the diversity and ambiguity of the image filling results, the filling results obtained by the image filling algorithms are often difficult to meet user expectations.

In the embodiments provided in this application, an interactive image filling method can be used to implement image filling.

Figure 4B:
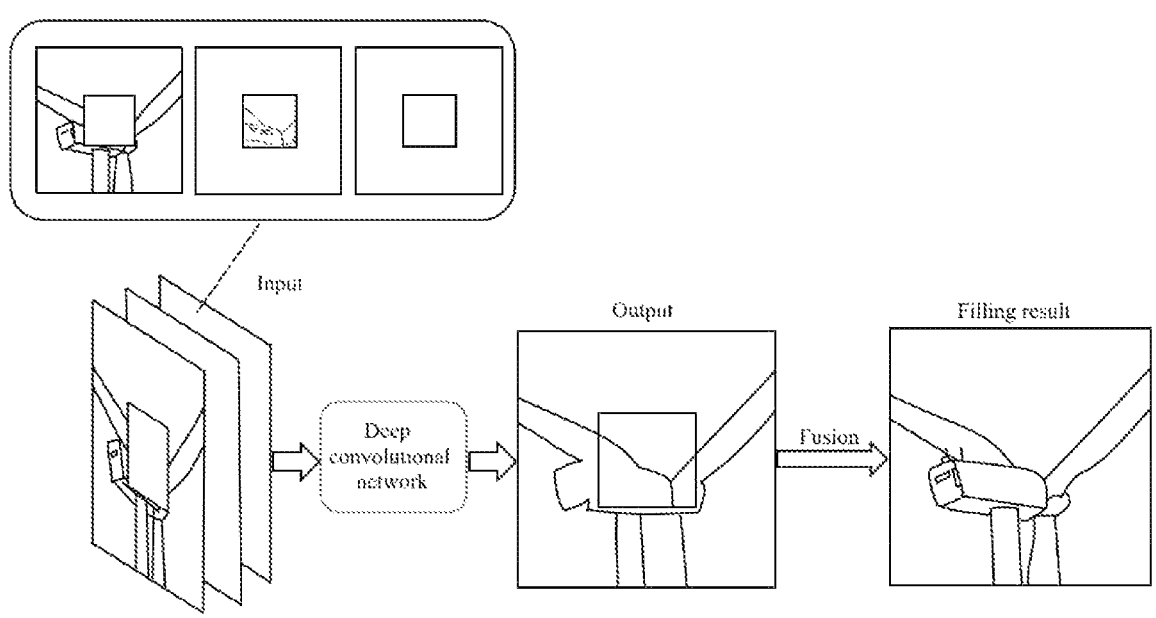
FIG. 4B illustrates a schematic diagram of an image filling method according to embodiments of the present application.

FIG. 4B illustrates a schematic diagram of an image filling method according to embodiments of the present application.

In the image filling method provided in FIG. 4B, a binary mask image of a missing region in a to-be-filled image and a desired feature image of the missing region can be obtained. Then, the to-be-filled image, the binary mask image of the missing region, and the desired feature image of the missing region can be input into a deep convolutional network for image feature extraction and restoration, to obtain a filled image of the missing region, wherein the to-be-filled image, the desired feature image of the missing region and the binary mask image of the missing region are respectively, for example, the left one, the middle one and the right one of the three images which are input to the depth convolutional network as shown in FIG. 4B, and the filled image of the missing region is, for example, an image output from the deep convolutional network as shown in in FIG. 4B. Image filling can be completed by performing image fusion of the filled image of the missing region with the to-be-filled image, and the filled image is for example the filling result in FIG. 4B.

The image filling algorithm according to the present application takes full advantage of the powerful capability of the deep convolutional network for visual feature extraction, makes full use of user interaction information, introduces the desired features of user interaction into the design of the deep convolutional network, introduces the deep convolutional network into application and deployment, and takes the expectation of the user of the missing region as part of the input to the deep convolutional network to guide the final image filling effect, which can greatly improve the effect of image filling and make the filling result meet the expectation of the user, especially for the to-be-filled image which has a relatively large information loss for the to-be-filled region. It is suitable for application scenarios such as adapting the display content with the environment.

In some embodiments, it can be detected whether the target object is within the target range.

When at least a part of the target object falls within the target range, the target object is removed from the background image to obtain a first image, wherein the first image includes a region from which the target object has been removed. Image filling can be performed on the region from which the target object has been removed to obtain a second image. A part of the second image corresponding to the target range can be determined as the target image. It should be noted that there are two situations in which at least a part of the target object falls within the target range: only a part of the target object falls within the target range, or all the target objects are located within the target range.

When the target object falls outside the target range, a part of the background image corresponding to the target range can be determined as the target image. It should be noted that the fact that the target object falls outside the target range here means that the target object is completely outside the target range.

With the above content provided by the present disclosure, after acquiring the background image of the display device and determining that the background image includes the target object (to be removed), it can be determined whether the operation of removing the target object needs to be performed by determining whether the target object is included in the target range. In the case that the target object is included within the target range, the target object is removed from the background image (that is, the overall image including the target range and the image around the target range), and the target object is removed according to the image information in the background image. More information can be provided in the process of image filling, thereby improving the effect of image filling. In the case that the target object is not included in the target range, the process of removing the target object present outside the target range in the background image can be omitted, so that the computing resources in the image processing process can be saved.

By displaying the target image within the target range after removing the target object on the display device, the display device can be made to achieve a "transparent" display effect, and the target object can be removed or cropped so that the target object is not included in the target image, which can improve the user experience in watching the display.

In step S110, the target image can be displayed on the display device, wherein the target image excludes the target object. Based on the above description, it can be known that the background behind the display device can be displayed as an image, so that the user who is watching in front of the display device can have an experience in which the display screen blends with the surrounding environment when the user is watching the display screen.

Figure 5:
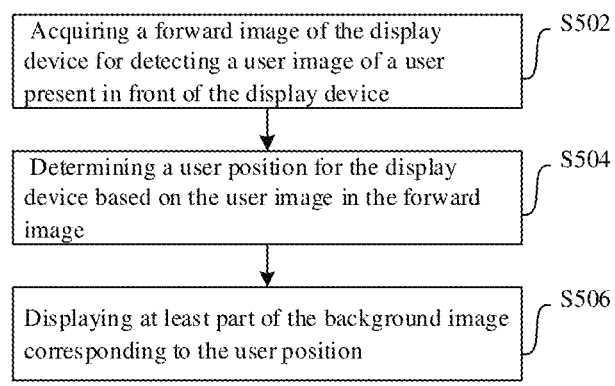
FIG. 5 illustrates a schematic flowchart of displaying a background image on a display device according to embodiments of the present application.

FIG. 5 illustrates a schematic flowchart of displaying a target image on a display device according to embodiments of the present application.

As shown in FIG. 5, in step S502, a forward image of the display device can be acquired to detect a user image of a user present in front of the display device. At least one image acquisition device can be disposed in front of the display device. The above-mentioned forward image can be acquired by an image acquisition device disposed at the front of the display device.

In some embodiments, the image acquisition device can acquire the forward image at a first frequency (e.g., 5 fps), and detect whether the forward image contains the user image. When it is detected that the forward image contains the user image, the forward image can be acquired at a second frequency (e.g., 25 fps), where the second frequency is higher than the first frequency, so as to realize real-time capture of user information present in front of the display device.

The acquired forward image can be processed with a face detection algorithm, and it has been detected whether there is a user who is watching in front of the display device. For example, RCNN, Fast-RCNN, Faster-RCNN, YOLO, SSD and other networks can be used as face detection algorithms to perform image processing on the forward image.

In some implementations, the face detection algorithm can use low-complexity Haar feature descriptors and cascaded classifiers to avoid occupying hardware resource of a graphics processing unit (GPU). The Haar feature descriptor can be quickly calculated by the method for integral image. The hierarchical classifiers use several stages of classifiers to quickly determine whether a large number of candidate regions in the picture (that is, regions where faces can appear) are human faces. Specifically, each stage uses different classifiers (such as AdaBoost) to classify candidate regions. If the candidate region is determined as a non-face in the first stage, the region is eliminated and does not participate in the classification of subsequent stages. Conversely, if the candidate region is determined as a face, the region will enter the second stage for further classification. If a candidate region is determined as a face at all stages, the algorithm finally outputs the region as a face.

In some implementations, after acquiring the above-mentioned forward image, the acquired forward image can be sent to a computing device provided external to the display device, and the external computing device executes a face detection algorithm to label the image regions in the forward image which include faces.

In step S504, the user position for the display device can be determined based on the user image contained in the forward image.

When it is detected that the user image is included in the forward image, a perpendicular distance from the user to the front of the display device can be determined based on the forward image and the user image. In the case where the image acquisition device for acquiring the forward image is a depth camera, the perpendicular distance between the user and the display device can be directly obtained through the image acquisition device. In the case that the image acquisition device that takes the forward image cannot acquire depth information, the distance between the user and the display device can be estimated according to the size of the face region detected in the forward image.

Figure 6:
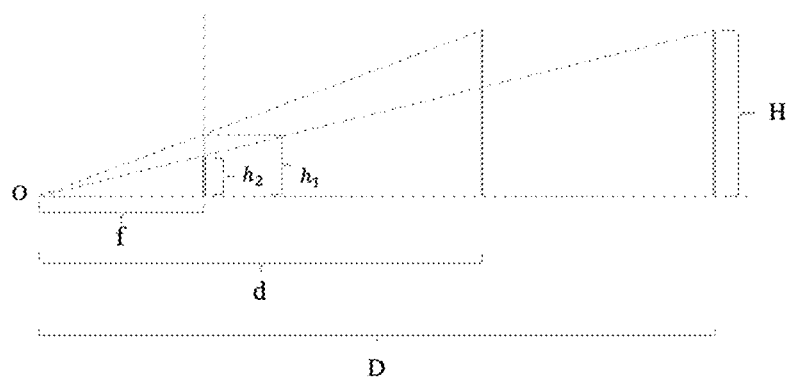
FIG. 6 illustrates a schematic diagram of estimating a distance from a user according to embodiments of the present application.

FIG. 6 illustrates a schematic diagram of estimating a distance from a user according to embodiments of the present application.

Assuming that an actual height of the face is fixed as H, it is pre-recorded that when the perpendicular distance between the user and the display device is d, the height of the face in the forward image is h1. Thus, when it is detected that a face with height h2 is detected in the forward image, according to the geometric relationship shown in FIG. 6, h1/H=f/d, h2/H=f/D, so it can be Equation (2) estimates the perpendicular distance D between the user and the display device at this time:

$$D = \frac{h_1}{h_2} d \qquad (2)$$

It can be understood that the difference in the height of the face between different users is small, so under the assumption that the actual height of the face of the user is fixed, the perpendicular distance between the user and the display device can be estimated with the above Equation (2).

Figure 7:
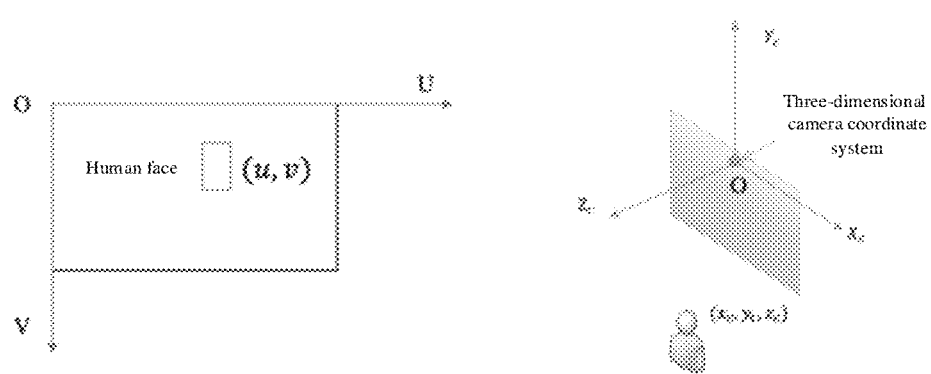
FIG. 7 illustrates a schematic diagram of estimating a position of a user according to embodiments of the present application.

FIG. 7 illustrates a schematic diagram of estimating a position of a user according to embodiments of the present application.

As shown in FIG. 7, a three-dimensional camera coordinate system $OX_c Y_c Z_c$ can be established with the image acquisition device disposed at the front of the display as the center, the two-dimensional pixel coordinate system of the imaging is represented as UOV, and the detected face in the forward image has a two-dimensional coordinate (u, v) in the pixel coordinate system. The following Equation (3) can be used to determine a three-dimensional coordinate $(x_c, y_c, z_c)$ of the face of the user in the camera coordinate system $OX_c Y_c Z_c$:

$$\begin{bmatrix} x_c \\ y_c \\ z_c \end{bmatrix} = z_c \begin{bmatrix} f_x & 0 & c_x \\ 0 & f_y & c_y \\ 0 & 0 & 1 \end{bmatrix}^{-1} \begin{bmatrix} u \\ v \\ 1 \end{bmatrix} \qquad (3)$$

Where $z_c$ can be determined as an approximate value D determined by the above Equation (2), $f_x$, $f_y$, $c_x$, $c_y$ are the internal parameters of the camera determined by pre-calibration, $f_x$, $f_y$ are the parameters representing the focal length of the camera, and $c_x$, $c_y$ represent the imaging parameters of the center offset, u, v is a two-dimensional coordinate of the face in the pixel coordinate system obtained based on the forward image.

Based on the three-dimensional coordinate $(x_c, y_c, z_c)$ of the user in the three-dimensional camera coordinate system as described above and the position of the forward image acquisition device, the position of the user relative to the display device can be determined.

Referring back to FIG. 5, in step S504, if a plurality of face regions are detected in the forward image, it can be considered that there are a plurality of users who are watching in front of the display device.

In some embodiments, in the case where images of a plurality of users are included in the user image, the method described in conjunction with FIG. 6 can be used to determine the perpendicular distance between each of the users and the display device, and the perpendicular distance between each of the users and the display device can be determined. The closest user is determined as the target user. The user image corresponding to the target user can be processed with the method described in conjunction with FIG. 7, and the position of the target user relative to the display device can be obtained. The position of the target user relative to the display device can be determined as the user position for the display device.

In other embodiments, in the case where images of a plurality of users are included in the user image, the position of each of the users relative to the display device can be determined with the methods described in conjunction with FIG. 6 and FIG. 7. An average of the positions of the plurality of users relative to the display device can be determined as the user position for the display device.

In yet other embodiments, the target user can be determined in response to a user selection. The position of the target user relative to the display device can be determined using the method described in conjunction with FIG. 6 and FIG. 7, and the position of the target user relative to the display device can be determined as the user position.

In some implementations, when it is detected that the forward image contains a user image, steps S502 to S504 can be repeated at a second frequency higher than the first frequency for capturing the dynamic change in the face position in front of the display device in real time.

In step S506, at least part of the background image corresponding to the user position can be displayed on the display device as the target image, that is, the background image within the target range.

In some embodiments, based on the user position determined in step S504, at least part of the background image can be displayed on the display device using a pinhole imaging model. For a certain point on the display screen (i.e., the imaging plane), visual information (i.e., RGB pixel value) of the point cloud data on the extension line between the face of the user and the point on the display screen is used as the content displayed on the display screen at that point. When the observing user is in different positions, the same position on the display screen will display the visual information of different points in the real scene. When there is a hole in the imaged image, an interpolation algorithm (such as bilinear interpolation) can be used to quickly display the image content according to the surrounding image. The RGB color value of each point on the imaging plane can be an average value of the RGB color values observed by different cameras.

As described above, it is determined in step S504 that the user position is a three-dimensional coordinate $(x_c, y_c, z_c)$ in the three-dimensional camera coordinate system. In addition, since the positions of (the array of) the image acquisition devices at the front of the display device and (the array of) the image acquisition devices at the back of the display device are fixed, the positions of the image acquisition devices at the back of the display device in the three-dimensional camera coordinate system can be determined. For example, the coordinate of the image acquisition device in the upper left corner behind the display device can be expressed as $(x_a, y_a, z_a)$, and the coordinate of the image acquisition device in the lower right corner can be expressed as $(x_b, y_b, z_b)$. In addition, assuming that the display region on the display device is a rectangle, the length and width of the display region can be expressed as $h_c$ and $w_c$.

FIG. 8 illustrates a schematic diagram of a process of displaying an image according to embodiments of the present application. As shown in FIG. 8, the display device is implemented in a form of a display screen. According to the coordinate of the observer $(x_c, y_c, z_c)$, the length he, the width we of the display screen, and the distance of the background from the display screen, the range of the observation region of the background image to be displayed can be determined (as shown by a cut-out display region that is, the target range in FIG. 8), where the coordinate of the upper left corner of the observation region can be denoted as $(x_1, y_1, z_1)$, and the coordinate of the upper right corner can be denoted as $(x_r, y_r, z_r)$. The distance between the image acquisition device on the left side of the display device and the left side is $h_m$, the distance between the image acquisition device on the right side and the right side is $h_m$, the distance between the image acquisition device on the upper side and the upper side is $w_m$, and the distance between the image acquisition device on the upper side and the upper side is $w_m$. The distance between the image acquisition device on the lower side and the lower side is wm.

Equations (4) and (5) can be established according to the geometric relationship shown in FIG. 8:

$$\frac{x_c - (x_a - h_m)}{x_c - x_l} = \frac{z_c - z_a}{z_c - z_l} \quad (4)$$

$$\frac{x_c - (x_b + h_m)}{x_c - x_r} = \frac{z_c - z_b}{z_c - z_r} \quad (5)$$

Combining Equation (4) and Equation (5), we can get:

$$x_l = x_c - \frac{(x_c - (x_a - h_m))(z_c - z_l)}{z_c - z_a} \quad (6)$$

$$x_r = x_c - \frac{(x_c - (x_b + h_m))(z_c - z_r)}{z_c - z_b} \quad (7)$$

Similarly, based on the pinhole imaging model, equations (8) and (9) can be used to calculate:

$$y_l = y_c - \frac{(y_c - (y_a + w_m))(z_c - z_l)}{z_c - z_a} \quad (8)$$

$$y_r = y_c - \frac{(y_c - (y_b - w_m))(z_c - z_r)}{z_c - z_b} \quad (9)$$

When the size of the display screen is small and the observing user is far away from the display screen, the size of the observation region can be equal to the display region of the display screen. The left boundary, right boundary, upper boundary, and lower boundary of the target range can be taken as $x_l=(x_a-h_m)$, $x_r=(x_b+h_m)$, $y_l=(y_a+w_m)$ and $y_r=(y_b-w_m)$ respectively.

Referring back to FIG. 1B, in some embodiments, when the target image is displayed on the display device in step S110, low-light enhancement can also be performed on the target image.

Figure 9:
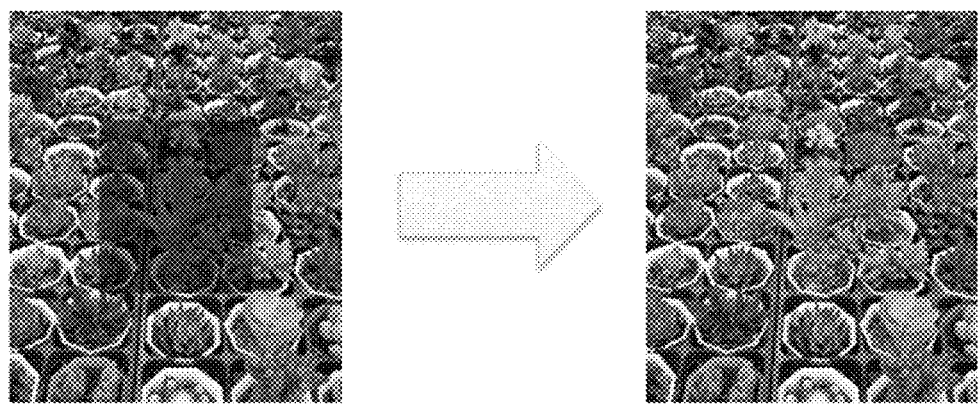
FIG. 9 illustrates a diagram showing an effect after low-light enhancement is performed on the background image.

FIG. 9 illustrates the effect of low-light enhancement on the background image. In the image on the left in FIG. 9, due to the presence of the display device, the light intensity in the central region is lower than that in the surrounding region, forming a shadow region in the center. If the display is directly based on the target image on the left side of FIG. 9, the display effect will not be in harmony with the surrounding environment, because when the user is watching, there is no occluding object in the surrounding environment.

In order to improve the display effect of the background pattern, a low-light enhancement algorithm can be used to process the original image acquired by the image acquisition device on the rear side of the display device. In some embodiments, the target image can be processed by Poisson Image Editing. The image on the right side of FIG. 9 is the result obtained after low-light enhancement processing. It can be seen that after the low-light enhancement processing, the shadow region in the middle of the original image is restored to an image with the same light intensity as the surrounding region.

The core idea of Poisson image editing is that when images are fused, using color gradients instead of color intensities can produce more realistic results. A new image in the region to be fused can be solved based on Equations (10) and (11) to achieve the low-light enhancement effect shown in FIG. 9:

$$\min_\alpha \int\int_\Omega |\nabla\alpha - v|^2, \alpha|_{\partial\Omega} = \alpha^*|_{\partial\Omega} \quad (10)$$

$$\Delta\alpha = div(v) \text{ s.t. } \alpha|_{\partial\Omega} = \alpha^*|_{\partial\Omega} \quad (11)$$

where $\Omega$ is a region to be fused in the image, $\partial\Omega$ represents the boundary of the region $\Omega$ to be fused, $\alpha$ is a new image to be solved which is defined inside the $\Omega$ domain, $\alpha^*$ is an optimal solution of $\alpha$, and v is a gradient of a source image (i.e. low light image region), $\nabla$ is a gradient operator, div represents a divergence, and st represents "subject to".

In some embodiments, when the target image is displayed, a display effect can also be superimposed on the target image. For example, other sensory effects such as vision, hearing, smell, etc. can be provided to the user. When the user is watching the display device, the display effect is as if the user was watching an outdoor landscape through a window, and the user can be provided with sound effects such as wind, rain, birdsong and/or olfactory effects such as floral fragrance.

In some embodiments, when displaying the target image, a virtual display effect can also be provided. For example, landscape effects that are not present in the background image can be superimposed on the target image, such as sea, garden, mountains, etc. In some implementations, other sensory effects corresponding to the virtual display effects, such as sound of waves, fragrance of flowers, etc., can be provided to the user.

With the method for displaying an image on a display device provided by the present application, a background image of the display device can be acquired, and the background image can be adaptively processed to obtain a target image of the display device. The processed target image can be displayed on the display device, so that when no output is required on the display device, the target image displayed by the display device can blend in with the surrounding environment. By removing occluding objects in the background image, a better display can also be provided to the watching user.

Figure 10:
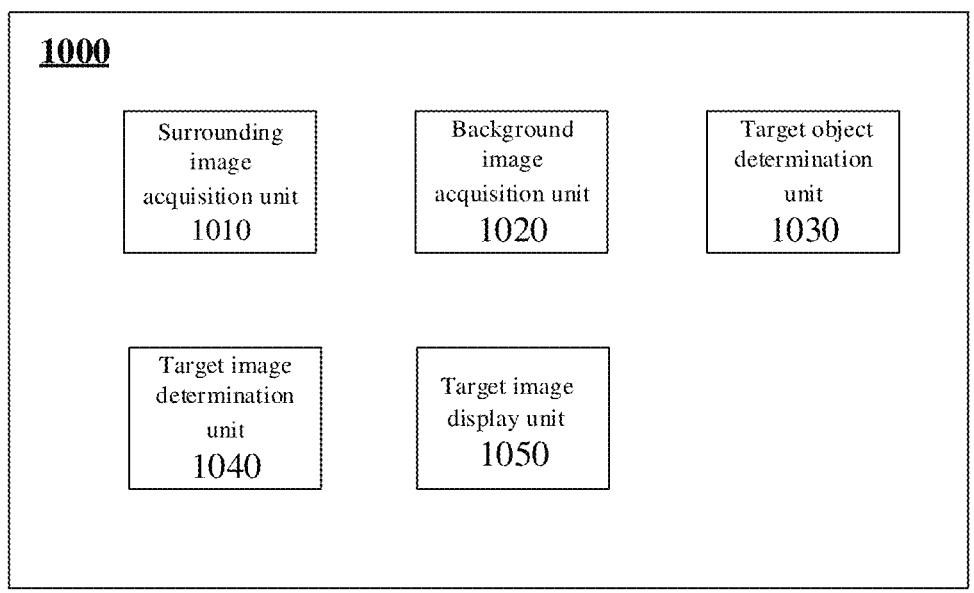
FIG. 10 illustrates a schematic block diagram of an apparatus for displaying an image on a display device according to embodiments of the present application.

FIG. 10 illustrates a schematic block diagram of an apparatus for displaying an image on a display device according to embodiments of the present application.

As shown in FIG. 10, the apparatus 1000 can include a surrounding image acquisition unit 1010, a background image acquisition unit 1020, a target object determination unit 1030, a target image determination unit 1040, and a target image display unit 1050.

The surrounding image acquisition unit 1010 can be configured to acquire a surrounding image of the display device with an image acquisition device. In some implementations, a 360-degree panoramic image around the display device can be acquired as a surrounding image with an image acquisition device disposed around the display device. In other embodiments, a backward image of the display device can be acquired as the surrounding image with the image acquisition device provided on the display device.

In the presence of a user in front of the display device, in some implementations, the angle between the image acquisition device and the display device, i.e. the angle at which the image acquisition device captures the surrounding image, can be adjusted based on the position of the user relative to the display device. Thereby, a surrounding image adapted to the angle of view of the user hen watching the display device can be captured according to the position of the user. In other implementations, the image acquisition device can be controlled to adjust an image acquisition frequency of the image acquisition device in response to a change in at least one of a moving range and a moving speed of the user. In still other implementations, one of a first image acquisition device and a second image acquisition can be enabled in response to a change in at least one of the moving range and moving speed of the user wherein the image acquisition device adjusts the image capture frequency of the image acquisition device.

In some embodiments, the image acquisition device can include a first image acquisition device and a second image acquisition device, wherein the first image acquisition device and the second image acquisition device are different types of image acquisition devices. The first image acquisition device can be a non-wide-angle image acquisition device, and the second image acquisition device can be a wide-angle image acquisition device.

The backward image of the display device can be acquired with a plurality of (at least two) image acquisition devices disposed at the back of the display device. Each of the image acquisition devices can include an image sensor and an optical element for collecting light for the image sensor. The image sensor can be CCD, CMOS or any other sensor capable of acquiring images. The optical element can be implemented as an optical lens group including at least one optical lens. The surrounding image can be obtained by splicing the images captured by the at least two wide-angle image acquisition devices and/or at least two non-wide-angle image acquisition devices described above.

In some implementations, the plurality of image acquisition devices described above can include at least two types of image acquisition devices. In some examples, the plurality of image acquisition devices can include a wide-angle image acquisition device and/or a non-wide-angle image acquisition device. For example, the plurality of image acquisition devices can include at least two wide-angle image acquisition devices and/or at least two non-wide-angle image acquisition devices.

The background image acquisition unit 1020 can be configured to determine a background image of the display device according to the surrounding image. In the case where the surrounding image is a panoramic image, the panoramic image can be cropped according to an orientation of the display device to determine the background image. In the case where the surrounding image is a backward image of the display device, the backward image can be determined as the background image.

In some embodiments, the first image acquisition device or the second image acquisition device can be controlled to be enabled based on distance information, wherein the distance information indicates a distance between the image acquisition device and a background object included in the backward image. The distance information is determined by the at least two wide-angle image acquisition devices or the at least two non-wide-angle image acquisition devices.

In some embodiments, when the distance between an object present in the backward image and the display device is less than (or equal to) a predetermined distance threshold, the wide-angle image acquisition device can be enabled to capture the backward image. When the distance between an object present in the backward image and the display device is greater than (or equal to) a predetermined distance threshold, the non-wide-angle image acquisition device can be enabled to capture a backward image. In some examples, the predetermined distance threshold can be 50 centimeters. It can be understood that, those skilled in the art can also set the distance threshold to any suitable value according to the actual situation.

In some implementations, the at least two image acquisition devices disposed at the back of the display device can be configured as an array of image acquisition devices. In the case where the image acquisition devices include wide-angle type image acquisition devices and non-wide-angle type image acquisition devices, the at least two image acquisition devices disposed at the back of the display device can be configured as an array of wide-angle type image acquisition devices and an array of non-wide-angle type image acquisition devices, respectively. The valid field of view of the imaging system can be increased with a form of an image acquisition device array.

In some examples, two groups of image acquisition devices can be disposed at the back of the display device, wherein one group is a horizontal row of wide-angle type image acquisition device group, and the other is a horizontal row of non-wide-angle type image acquisition device group. It can be understood that this is only a schematic example of the present application, and those skilled in the art can set the wide-angle type image acquisition device group and the non-wide-angle type image acquisition device group according to the actual situation as desired. For example, the wide-angle type image acquisition device group and the non-wide-angle type image acquisition device group can also be disposed on two parallel straight lines, respectively. For another example, image acquisition device groups of the same type can also be disposed on at least two parallel lines. Furthermore, it can be understood that the number of image acquisition devices in each type of image acquisition device group is not limited here.

The target object determination unit 1030 can be configured to acquire a target range and a target object in the background image.

In some embodiments, the target range can be determined based on the size of the display device. For example, a part of the background image that is directly occluded by the display device when the display device is being watched from the front can be determined as the target range. In other embodiments, when there is a user in front of the display device, a user position of the user relative to the display device can be determined, and the target range can be determined based on the user position. That is, a watching range of the user in the background image which is occluded by the display device can be determined as the target range.

The above-described embodiments can be applied when the size of the display device is small, the display device is relatively close to the object in the background, or the user is farther away from the display device. In this case, no matter from where the user watches the display device, the difference in the target range in the background image which is occluded by the display device is relatively small. Therefore, the target range can be directly determined according to the size of the display device without considering the watching position of the user. By displaying the background image within the target range on the display device, a display effect that as if the display device was "transparent" can be formed.

In some embodiments, when there are a plurality of users in front of the display device, images of the plurality of users can be detected to determine a user from the plurality of users who is watching the display device. A user watching the display device can be determined as a target user and a position of the target user relative to the display device can be determined as the user position.

The above-described embodiments are applied when the size of the display device is large, the display device is far away from the object in the background, or the user is at a short distance from the actual device. In this case, the target range in the background image that is occluded by the display device when the user is watching the display device will change greatly with the change in the watching position of the user. Therefore, the watching position of the user can be determined and the target range can be determined based on at least the watching position of the user, the size of the display device, and the distance between the display device and the background. By displaying the background image within the target range as determined on the display device, the "transparency" effect of the display device can be adapted to the watching position of the user, so that the effect watched by the user is more natural.

In practical applications, those skilled in the art can determine the corresponding threshold according to the actual situation to determine whether the target range is sufficiently large (or small) with the change in the watching position of the user, so as to determine the method to determine the target range.

In some embodiments, acquiring the target object in the background image can include performing object detection on the background image to obtain a category of the object present in the background image. The target object is determined by determining whether an object present in the background image belongs to a predetermined category.

In some embodiments, an object of a predetermined category present in the background image of the display device can be determined as the target object. For example, an object of a predetermined category can be people, tables, cabinets, chairs, and the like. Those skilled in the art can set a category of objects as the target object according to the actual situation as desired.

In other embodiments, the target object determination unit 1030 can determine an object with a distance from the display device less than a predetermined distance threshold as the target object. It can be understood that an object with a short distance behind the display device will cause more occlusions to the background behind the display device. Therefore, the object in the background image can be determined as the target object according to the distance.

In some implementations, the target object determination unit 1030 can include detecting at least one object present in the background image. The background image can be processed by an image segmentation algorithm to determine the presence of at least one object. The distance of each of the detected at least one object from the display device can then be determined. The distance between each object and the display device can be determined by means of a distance sensor or binocular ranging. An object with a distance from the display device less than a predetermined distance threshold can then be determined as the target object.

In other implementations, a distance map can be determined for the background image. The pixels in the distance map correspond to the pixels in the background image one-to-one, and the pixel value of each pixel in the distance map indicates the distance between the object corresponding to the respective pixel in the background image and the display device. The above pixel-level distance map can be generated by means of binocular ranging. The distance between the object corresponding to each pixel in the background image and the display device can be determined according to the distance map, and the object with a distance from the display device smaller than a predetermined distance threshold is determined as the target object.

In still other embodiments, the target object determination unit 1030 can include determining that a moving object is present in the background image, and determining the moving object as the target object.

For example, at least two surrounding images can be acquired with an image acquisition device disposed at the back of the display device, and whether a moving object is present in the surrounding images can be determined by comparing the at least two surrounding images at different times.

In some implementations, a moving speed of the moving object can be determined based on acquisition times of the at least two surrounding images and the position of the moving object in the at least two surrounding images, and a moving object with a moving speed greater than a predetermined speed threshold can be determined as the target object.

In yet other embodiments, whether an object in the background is a target object can be determined based on a user selection. In some implementations, an object in the background can be determined as the target object in response to user input. In other implementations, whether the object in the background is the target object can be determined by detecting the user state. In some examples, the physiological information (e.g., heartbeat, blood pressure, etc.) of the user can be detected and whether the background object is the target object can be determined based on the detection results. For example, when it is detected that the heartbeat, blood pressure and other physiological parameters of the user exceed a predetermined threshold, it can be considered that the currently appearing object can have caused a fright to the user, and therefore the current object can be determined as the target object and the target object can be removed in the subsequent steps.

The target image determination unit 1040 can be configured to determine the target image according to the background image, the target range, and the target object.

In some embodiments, the target object can be removed from the background image to obtain a first image, wherein the first image includes a region from which the target object has been removed.

In some embodiments, the target object can be removed in response to a result of the user interaction. For example, user input can be received as a result of user interaction by displaying a user interaction interface on a display device and accepting user input via the user interaction interface.

The user can select and/or confirm to remove the above-mentioned target object by inputting an instruction via the user interaction interface (or user interaction device), so as to obtain a better display effect.

In other embodiments, whether to remove the target object can also be determined through a predefined rule, so as to realize the automatic removal of the target object.

In some implementations, an area occupied by the target object in the background image can be determined. When the area occupied by the target object in the background image exceeds a predetermined area threshold, the target object can be removed from the background image. The area threshold mentioned here can be an absolute threshold or a relative threshold.

In other implementations, the area occupied by the target object in the background image can be determined. When the target object is located within a predetermined region, the target object can be removed from the background image.

In still other implementations, a distance between the target object and the display device can be determined, and when the distance between the target object and the display device is less than a predetermined distance threshold, the target object can be removed from the background image. When the distance between the target object and the display device is greater than or equal to a predetermined distance threshold, the target object may not be removed, thereby reducing the amount of calculation for image filling after the target object has been removed.

In some embodiments, ambient sensors can also be used to detect an ambient condition and remove a target object based on the ambient condition. For example, the presence of a user around the display device can be determined through audio detection, light detection, motion detection, proximity detection, wireless signal/Bluetooth signal detection, and the target object can be removed based on the result of detecting the presence of the user. For another example, it can be determined according to the positioning sensor that the display device is currently located in a predetermined geographical region, and the target object is removed from the predetermined geographical region, and so on.

In some embodiments, after the above-mentioned target object has been removed, image filling can be performed on the region from which the target object has been removed to obtain the second image. A part of the second image corresponding to the target range can be determined as the target image. In some implementations, pixels corresponding to the target object can be removed from the background image, and image filling is performed on the blank region left in the background image after the target object has been removed. Image filling can be performed on the region from which the target object has been removed according to the image information of the background image to obtain a filled background image.

In some embodiments, it can be determined whether the target object falls within the target range.

When at least a part of the target object falls within the target range, the target object is removed from the background image to obtain a first image, wherein the first image includes a region from which the target object has been removed. Image filling can be performed on the region from which the target object has been removed to obtain a second image. A part of the second image corresponding to the target range can be determined as the target image.

When the whole target object falls outside the target range, a part of the background image corresponding to the target range can be determined as the target image.

With the above content provided by the present disclosure, after acquiring the background image of the display device and determining that the background image includes the target object (to be removed), it can be determined whether the operation of removing the target object needs to be performed by determining whether the target object is included in the target range. In the case that the target object is included within the target range, the target object is removed from the background image (that is, the overall image including the target range and the image around the target range), and the target object is removed according to the image information in the background image. More information can be provided in the process of image filling, thereby improving the effect of image filling. In the case that the target object is not included in the target range, the process of removing the target object present outside the target range in the background image can be omitted, so that the computing resources in the image processing process can be saved.

By displaying the target image within the target range after removing the target object on the display device, the display device can be made to achieve a "transparent" display effect, and the target object can be removed or cropped so that the target object is not included in the target image, which can improve the user experience in watching the display.

The target image display unit 1050 can be configured to display the target image on the display device, wherein the target image excludes the target object. Based on the above description, it can be known that the background behind the display device can be displayed as an image, so that the user who is watching in front of the display device can have an experience in which the display screen blends with the surrounding environment when the user is watching the display screen.

In some embodiments, when the target image is displayed, a display effect can also be superimposed on the target image. For example, other sensory effects such as vision, hearing, smell, etc. can be provided to the user. When the user is watching the display device, the display effect is as if the user was watching an outdoor landscape through a window, and the user can be provided with sound effects such as wind, rain, birdsong and/or olfactory effects such as floral fragrance.

In some embodiments, when displaying the target image, a virtual display effect can also be provided. For example, landscape effects that are not present in the background image can be superimposed on the target image, such as sea, garden, mountains, etc. In some implementations, other sensory effects corresponding to the virtual display effects, such as sound of waves, fragrance of flowers, etc., can be provided to the user.

With the apparatus for displaying an image on a display device provided by the present application, a background image of the display device can be acquired, and the background image can be adaptively processed to obtain a background image of the display device. The processed background image can be displayed on the display device, so that when no output is required on the display device, the background image displayed by the display device can blend in with the surrounding environment. By removing occluding objects in the background image, a better display can also be provided to the watching user.

Figure 11:
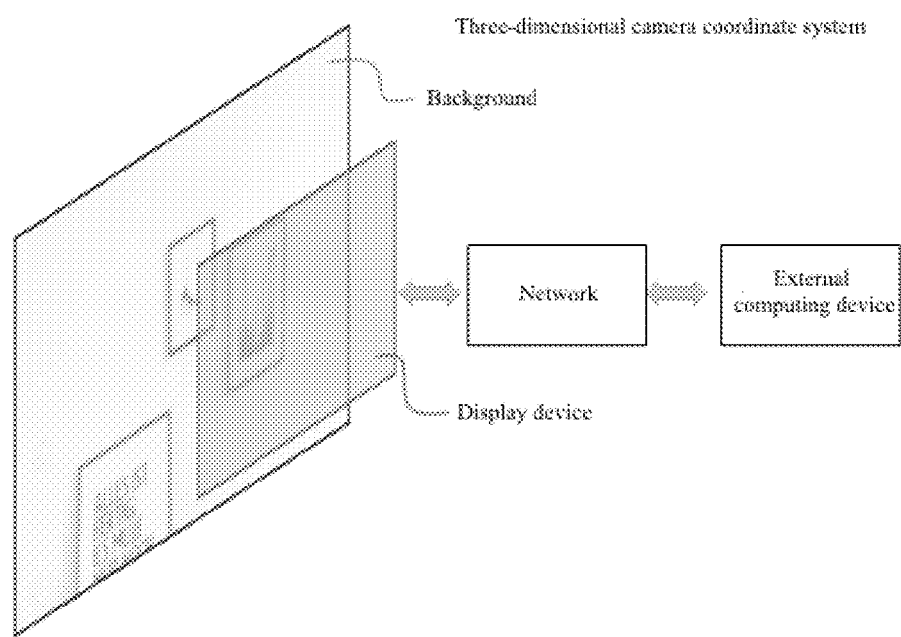
FIG. 11 illustrates a schematic diagram of an image processing system according to the present application.

FIG. 11 illustrates a schematic diagram of an image processing system according to the present application. As shown in FIG. 11, the system 1100 can include a display device 1110 with a background 1120 behind the display device, and the display screen can be connected to an external computing device in a wired or wireless manner. The computing device can include a processor, and the processor can implement the aforementioned method for displaying an image on a display device provided by the present application by executing a software program.

Figure 12:
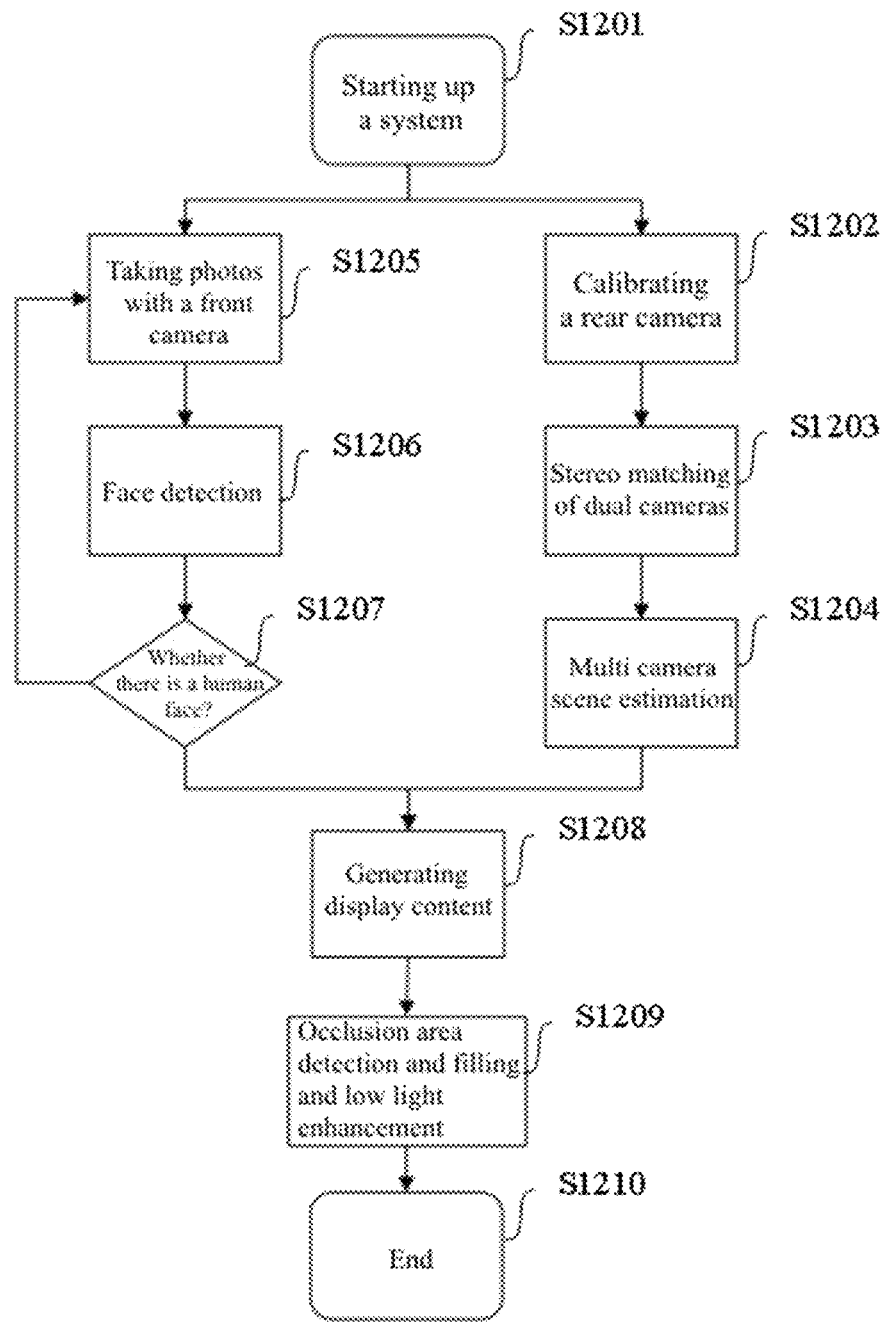
FIG. 12 illustrates a schematic process of displaying an image on a display device according to the present application.

FIG. 12 illustrates a schematic process of displaying an image on a display device according to the present application. As shown in FIG. 12, in step S1201, the system starts up. In step S1202, an image acquisition device (such as a camera) at the back of the display screen can be calibrated. In step S1203, the rear camera can be used to implement stereo matching of dual cameras, so as to obtain depth (i.e. distance) information of the image behind the display screen. In step S1204, images acquired by a plurality of cameras can be used for stitching, so as to obtain information of a backward image with a larger angle of view.

In step S1205, an image acquisition device (such as a camera) at the front of the display screen can be used to take a forward picture, and in step S1206, it is detected whether there is a human face in the forward picture. In step S1207, if there is no human face in the forward picture, the method can return to step S1205, and continue to use the front camera to take the forward picture. If it is determined in step S1207 that there is a human face in the forward picture, then in step S1208, the backward image captured by the rear camera can be used to generate display content based on the position of the user detected in the forward picture. In step S1209, target object detection, removal, and filling can be further performed on the display content, and low-light enhancement can be performed on the display content. The method ends in step S1210.

Figure 13:
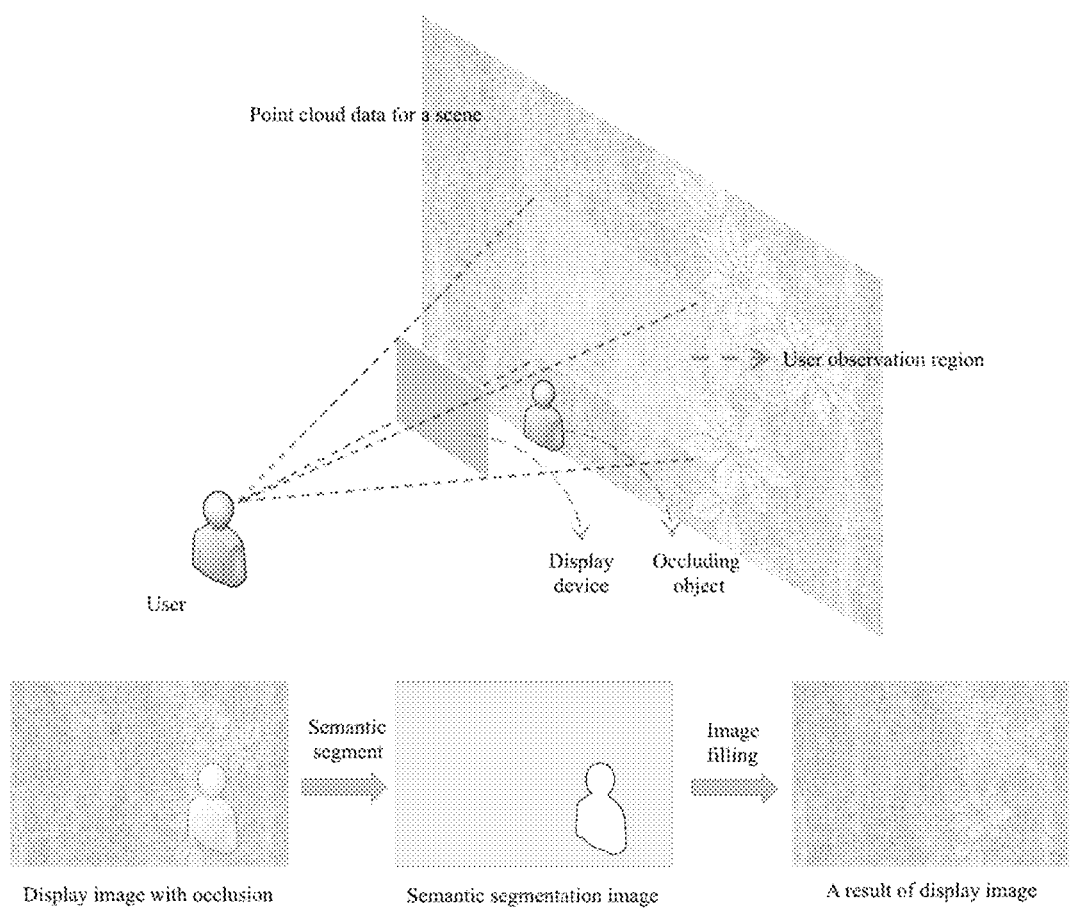
FIG. 13 illustrates a schematic diagram showing an effect of displaying an image on a display device according to embodiments of the present application.

FIG. 13 illustrates a schematic diagram of the effect of displaying an image on a display device according to embodiments of the present application. As shown in FIG. 13, there is an occluding object (person) between the display screen and the background behind the display screen. The region on the display screen which the user is watching is part of the background in relation to the size of the display screen. The occluded display image can be acquired with a camera disposed at the back of the display. The occluded display image can be semantically segmented to obtain a semantic segmentation map indicating the occluding object, and then the occluding object can be removed from the occluded display image, and image filling can be performed on the display image from which the occluding object has been removed, to obtain a final result image for display.

Figure 14:
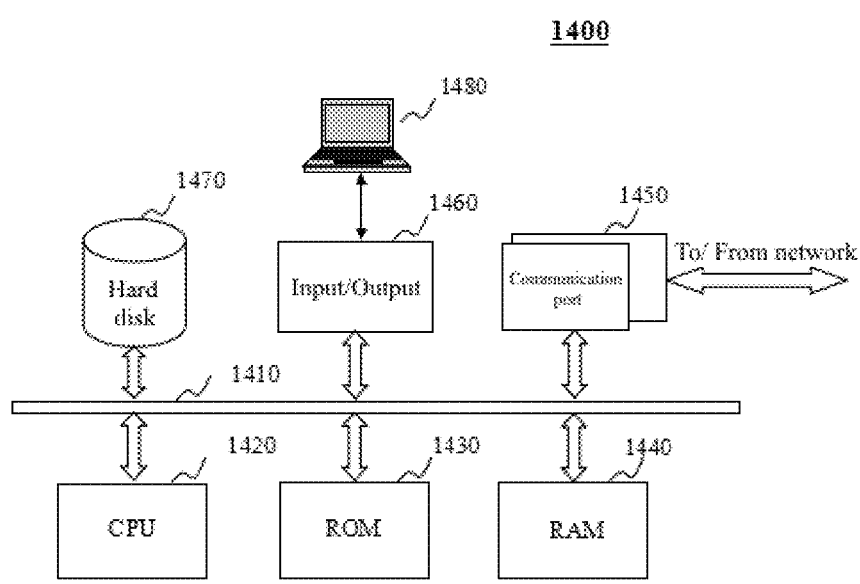
FIG. 14 illustrates an architecture of a computing device according to embodiments of the present application.

In addition, the embodiments of the present application can be implemented by means of the architecture of the computing device shown in FIG. 14. FIG. 14 illustrates the architecture of the computing device. As shown in FIG. 14, a computing device 1400 can include a bus 1410, one or at least two CPUs 1420, a read only memory (ROM) 1430, a random access memory (RAM) 1440, a communication port 1450 connected to a network, input/output components 1460, a hard disk 1470, etc. A storage device in the computing device 1400, such as the ROM 1430 or the hard disk 1470, can store various data or files used for processing and/or communication of the object detection method provided by the present application and program instructions executed by the CPU. The computing device 1400 can also include a user interface 1480. However, the architecture shown in FIG. 14 is only exemplary, and when implementing different devices, one or at least two components in the computing device shown in FIG. 14 can be omitted according to actual needs.

At least one embodiment of the present application also provides an electronic apparatus, including:

a display device;

an image acquisition device configured to acquire a surrounding image of the display device;

an ambient sensor configured to obtain information about surrounding environment of the display device; and a processor, configured to:

determine a background image of the display device according to the surrounding image;

acquire a target range and a target object in the background image;

determine a target image according to the background image, the target range and the target object in the background image;

control the display device to display the target image;

wherein the target image contains the target object in the background image, properties of the target object in the target image are different from properties of the target object in the background image, and the properties of the target object in the target image change in response to a change in the information about the surrounding environment.

The properties of the target object in the above target image and the background image can include size, shape, color, rotation angle, state (static and dynamic), content, quantity, etc. of the target image. The ambient sensor can include a motion detector, a light detector, an audio detector, a thermal sensor, a wireless signal detector, a Bluetooth signal detector, an electric field sensor for proximity detection and/or gesture-based control, an infrared-based sensor for ambient light detection and/or proximity detection and/or a gesture-based control, an ultrasonic transducer sensor for proximity detection and/or gesture-based control, a geospatial and/or global positioning sensor. The information about the surrounding environment includes audio information, ambient light brightness, direction of ambient light, outside temperature, weather, surrounding user conditions, electric field/magnetic field strength and other information. The properties of the target object in the target image change in response to the change in the information about the surrounding environment, specifically, when the information about the surrounding environment is sensed to be rainy weather, if the initial state of the target object is a smiling face, at this time a smiling face changes to a displeased expression, and when the surrounding environment changed from rainy weather to sunny weather, the target object changed from the displeased expression to a smiling face at this time. For example, when detecting that the expression of the user is displeased, the target object will adjust the color to a color that makes people feel happy. The properties of the target object will change with the change in the information about the surrounding environment, further improving the user experience. For example, the target object is a poster, and the content of the poster can also be changed according to different festivals. Specifically, if the ambient sensor senses that it is the Mid-Autumn Festival, the poster will become the content related to the Mid-Autumn Festival; if the Dragon Boat Festival is sensed, the content will become related to the theme of Dragon Boat Festival.

At least one embodiment of the present application also provides an electronic apparatus, including: a display screen; and a processor, wherein the processor is configured to perform the aforementioned method to display an image on the display screen.

At least one embodiment of the present application also provides a non-transitory computer-readable medium having instructions stored thereon, which, when executed, can cause a computer to perform the aforementioned method.

The embodiments provided in this application can be applied to home scenarios. For example, the methods provided herein can be used to display data on a television. When the user is not watching the TV, an image of a background wall or a background object can be displayed on the TV, so that the TV can blend in with the home environment.

The embodiments provided in this application can also be applied to commercial scenarios. For example, large-sized display screens can be set up in commercial environments such as shopping malls and other public places. The user can interact with such a display screen, or information can be presented to the user through the display screen. When the display screen is not in use, the background image behind the display screen can be displayed on the display screen (for example, information such as stores and signs in the shopping mall behind the display screen can be displayed) to make the display screen blend in with the surrounding environment and avoid the screen occluding to the sight of the user.

The embodiments provided in this application can also be applied to traffic scenarios. The electronic apparatus according to embodiments of the present application can be configured on a vehicle. For example, the structure of the vehicle can cause a blind spot for the driver's sight, and the structure at the blind spot can be configured as a display device, which can be applied with the embodiments provided in this application. In this way, the background image behind the blind spot can be displayed at the conventional blind spot, so that the driver's blind spot can be eliminated.

The embodiments provided in this application can also be applied to stealth scenarios. For example, wearable devices such as shields, clothing, helmets, etc. can be configured as display devices, which can be applied with the embodiments provided in this application. In this way, when using such a wearable device, the user can be provided with a stealth effect. Similarly, a display device can also be configured on equipment such as unmanned aerial vehicles and unmanned vehicles, which can be applied with the embodiments provided in this application. When such equipment works, it can provide a stealth effect to the equipment.

Those skilled in the art can clearly understand that the embodiments of the present disclosure can be implemented by means of software in combination with necessary general-purpose hardware, and can also be implemented by means of dedicated hardware, but the former can be the preferred implementation in many cases. Based on this understanding, the technical solutions of the present invention are essentially embodied in the form of software, hardware, firmware or any combination thereof, and the computer software product is stored in a readable storage medium, such as a magnetic storage medium (such as a hard disk) or an electronic storage medium (such as a ROM, a flash memory), etc., including several instructions for causing a computing device (which can be a computer, a server, or a network device, etc.) to execute the methods described in various embodiments of the present invention.

Unless otherwise defined, all terms (including technical and scientific terms) used herein have the same meaning as commonly understood by one of ordinary skill in the art to which the present invention belongs. It should also be understood that terms such as those defined in ordinary dictionaries should be construed as having meanings consistent with their meanings in the context of the related art, and should not be construed in an idealized or highly formalized sense unless explicitly stated herein defined as such.

The above is an illustration of the present invention and should not be construed as limiting it. Although several exemplary embodiments of the present invention have been described, those skilled in the art will readily appreciate that many modifications are possible in the exemplary embodiments without departing from the novel teachings and advantages of the present invention. Accordingly, all such modifications are intended to be included within the scope of the present invention as defined in the claims. It is to be understood that the foregoing descriptions of the present invention are not to be considered limited to the particular embodiments disclosed, and that modifications to the disclosed embodiments and other embodiments are intended to be included within the scope of the appended claims. The present invention is defined by the claims and their equivalents.

What is claimed is:

1. An electronic apparatus, comprising:
   a display device;
   an image acquisition device, wherein the image acquisition device is located on the back of the display device and is configured to acquire a surrounding image of the display device; and
   a processor configured to:
   determine a background image of the display device according to the surrounding image;
   acquire a target range and a target object in the background image;
   determine a target image according to the background image, the target range and the target object; and
   control the display device to display the target image, wherein the target image excludes the target object, and
   the processor is further configured to adjust an image acquisition frequency of the image acquisition device in response to a change in at least one of a moving range and a moving speed of a user.

2. The electronic apparatus of claim 1, wherein the display device comprises:
   a frame;
   a flexible display screen disposed on one side of the frame; and
   a control circuit disposed on the other side of the frame, wherein the flexible display screen is connected to the control circuit.

3. The electronic apparatus of claim 2, wherein the flexible display screen comprises a curved display portion, and wherein the flexible display screen is connected to the control circuit comprises: the curved display portion is connected to the control circuit.

4. The electronic apparatus of claim 3, wherein an angle between the curved display portion and a front surface of the display device is 90 degrees, and an optical axis of the image acquisition device is perpendicular to the front surface of the display device.

5. The electronic apparatus of claim 1, wherein the determining the target image according to the background image, the target range and the target object comprises:
   removing the target object from the background image to obtain a first image, wherein the first image includes a region from which the target object has been removed;
   performing image filling on the region after the target object has been removed to obtain a second image; and
   determining a part of the second image corresponding to the target range as the target image.

6. The electronic apparatus of claim 5, wherein the performing image filling on the region after the target object has been removed to obtain the second image comprises:
   performing image filling on the region from which the target object has been removed according to image information of the background image to obtain the second image.

7. The electronic apparatus of claim 1, wherein the determining the target image according to the background image, the target range and the target object comprises:
   detecting whether the target object is within the target range;
   in a case where at least a part of the target object is within the target range, removing the target object from the background image to obtain a first image, wherein the first image includes a region from which the target object has been removed;
   performing image filling on the region after the target object has been removed to obtain a second image;
   determining a part of the second image corresponding to the target range as the target image; and
   in a case where the target object is outside the target range, determining a part of the background image corresponding to the target range as the target image.

8. The electronic apparatus of claim 1, wherein the image acquisition device comprises a first image acquisition device and a second image acquisition device,
   wherein the first image acquisition device and the second image acquisition device are different types of image acquisition devices.

9. The electronic apparatus of claim 8, wherein the first image acquisition device is configured to acquire a non-wide-angle image and the second image acquisition device is configured to acquire a wide-angle image.

10. The electronic apparatus of claim 9, wherein the image acquisition device comprises at least two wide-angle image acquisition devices and/or at least two non-wide-angle image acquisition devices; the processor is further configured to obtain the background image by stitching images captured by the at least two wide-angle image acquisition devices and/or the at least two non-wide-angle image acquisition devices.

11. The electronic apparatus of claim 10, wherein the processor is further configured to:
    control enabling one of the first image acquisition devices and the second image acquisition devices according to distance information;
    wherein the distance information indicates a distance between the image acquisition device and a background object included in the background image, and the distance information is obtained by the at least two wide-angle image acquisition devices or the at least two non- contact image acquisition devices.

12. The electronic apparatus of claim 11, wherein the controlling the enabling one of the first image acquisition devices and the second image acquisition devices according to the distance information comprises:
    the processor enables the wide-angle image acquisition devices in a case where the distance information indicates that the distance between the image acquisition device and the object included in the background image is less than a predetermined distance.

13. The electronic apparatus of claim 1, wherein acquiring the target object in the background image comprises:
    performing object detection on the background image to obtain a category of an object present in the background image;
    determining whether the present object belongs to a predetermined category; and
    determining the object belonging to the predetermined category as the target object.

14. The electronic apparatus of claim 13, wherein the object belonging to the predetermined category is a person.

15. The electronic apparatus of claim 1, wherein acquiring the target object in the background image comprises:
    determining that a moving object is present in the background image based on at least two surrounding images acquired by the image acquisition device at different times; and
    determining the moving object as the target object.

16. The electronic apparatus of claim 1, wherein the electronic apparatus further comprises an ambient sensor, the ambient sensor is configured to acquire information about the surrounding environment of the display device; and the processor is further configured to change the target object in response to a change in the surrounding information.

17. The electronic apparatus of claim 1, wherein acquiring the target range comprises:
    determining the target range based on a size of the display device.

18. The electronic apparatus of claim 1, wherein obtaining the target range comprises:
    determining a user position relative to the display device;
    determining the target range based on the user position.

19. A method for displaying an image on a display device, wherein an image acquisition device is located on the back of the display device, the method comprises:
    acquiring, by the image acquisition device, a surrounding image of the display device;
    determining a background image of the display device according to the surrounding image;
    acquiring a target range and the target object in the background image;
    determining a target image according to the background image, the target range and the target object; and
    controlling the display device to display the target image;
    wherein the target image excludes the target object, and
    wherein an image acquisition frequency of the image acquisition device is adjusted in response to a change in at least one of a moving range and a moving speed of a user.

20. An electronic apparatus, comprising:
    a display device;
    an image acquisition device, wherein the image acquisition device is located on the back of the display device and is configured to acquire a surrounding image of the display device;
    an ambient sensor configured to obtain information about surrounding environment of the display device; and
    a processor configured to:
    determine a background image of the display device according to the surrounding image;
    acquire a target range and a target object in the background image;
    determine a target image according to the background image, the target range and the target object in the background image; and
    control the display device to display the target image;
    wherein the target image contains the target object in the background image, properties of the target object in the target image are different from properties of the target object in the background image, and the properties of the target object in the target image change in response to a change in the information about the surrounding environment, and
    wherein an image acquisition frequency of the image acquisition device is adjusted in response to a change in at least one of a moving range and a moving speed of a user.

* * * * *